US012775312B2

(12) United States Patent
Tsorng et al.

(10) Patent No.: US 12,775,312 B2
(45) Date of Patent: Oct. 27, 2026

(54) HANDLE ASSEMBLY FOR INSERTING AND REMOVING AN EXPANSION CARD

(71) Applicant: Quanta Computer Inc., Taoyuan City (TW)

(72) Inventors: Yaw-Tzorng Tsorng, Taoyuan City (TW); Tung-Hsien Wu, Taoyuan City (TW); Chia-Hung Kao, Taoyuan City (TW); Guan-Kai Lien, Taoyuan City (TW)

(73) Assignee: Quanta Computer Inc., Taoyuan City (TW)

( * ) Notice: Subject to any disclaimer, the term of this patent is extended or adjusted under 35 U.S.C. 154(b) by 877 days.

(21) Appl. No.: 18/181,141

(22) Filed: Mar. 9, 2023

(65) Prior Publication Data

US 2024/0302874 A1 Sep. 12, 2024

(51) Int. Cl.
*G06F 1/185* (2026.01)
*F16M 13/02* (2006.01)

(52) U.S. Cl.
CPC ............. *G06F 1/185* (2013.01); *F16M 13/02* (2013.01)

(58) Field of Classification Search
CPC .......... G06F 1/186; G06F 1/185; G06F 1/187; H05K 7/1431; H05K 7/1487; H01R 43/205
See application file for complete search history.

(56) References Cited

U.S. PATENT DOCUMENTS

| | | | | |
|---|---|---|---|---|
| 6,315,586 B1 * | 11/2001 | Joyce | G06F 1/184 | 439/157 |
| 9,763,351 B1 * | 9/2017 | Ulrich | G06F 1/186 | |
| 10,080,300 B1 * | 9/2018 | Olesiewicz | H05K 7/1402 | |
| 10,863,644 B1 * | 12/2020 | Tseng | H05K 7/1487 | |
| 10,863,647 B1 * | 12/2020 | Escamilla | H05K 5/023 | |
| 10,936,527 B1 * | 3/2021 | Chen | G06F 1/185 | |
| 11,490,536 B1 * | 11/2022 | An | G06F 1/185 | |
| 11,703,919 B1 * | 7/2023 | Zhong | G06F 1/185 | 361/759 |
| 2004/0084388 A1 * | 5/2004 | Roesner | G06F 1/184 | 211/41.17 |
| 2015/0131227 A1 * | 5/2015 | Howell | G06F 1/185 | 211/26 |
| 2017/0293326 A1 * | 10/2017 | Lin | G11B 33/128 | |
| 2020/0068731 A1 * | 2/2020 | Tsorng | H05K 5/0221 | |
| 2020/0260615 A1 * | 8/2020 | Leigh | G06F 1/187 | |
| 2022/0304177 A1 * | 9/2022 | Lewis | G06F 1/185 | |
| 2023/0009926 A1 * | 1/2023 | Tsorng | G06F 1/183 | |

* cited by examiner

*Primary Examiner* — Jeffrey T Carley
(74) *Attorney, Agent, or Firm* — Nixon Peabody LLP

(57) ABSTRACT

A handle assembly includes a bracket, a first handle movably coupled to the bracket, and a second handle movably coupled to the bracket. The bracket can be movably coupled to a housing of a computing device. The first handle is movable between an insertion orientation and an ejection orientation. The second handle is movable between a locked orientation and an unlocked orientation and includes a locking structure to lock the expansion card within the housing. When the bracket is coupled to the housing, movement of the first handle between the insertion orientation and the ejection orientation causes the bracket and the second handle to move linearly within the housing. Movement of the second handle between the locked orientation and the unlocked orientation causes the locking structure to move between a locked position and an unlocked position.

12 Claims, 19 Drawing Sheets

HANDLE ASSEMBLY FOR INSERTING AND REMOVING AN EXPANSION CARD

FIELD OF THE INVENTION

The present disclosure relates generally to a handle assembly, and more specifically, to a handle assembly for inserting an expansion card into a computing device and removing the expansion card from the computing device.

BACKGROUND OF THE INVENTION

Computing systems and devices often include a variety of electronic components, including expansion cards that can be inserted into connectors on the motherboard of the computing device. Generally these expansion cards can be locked into place after being inserted into the computing device to ensure that they are not inadvertently removed from the computing device. Such locking techniques generally involve the use of specific hardware, such as screws, tool, etc. However, it can be time consuming to use this hardware to lock and unlock the expansion card. Thus, new devices are needed that can be used to insert an expansion card into a computing device and remove the expansion card from the computing device.

SUMMARY OF THE INVENTION

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

In a first implementation, the present disclosure is directed to a handle assembly for interacting with an expansion card configured to be inserted into a computing device. The handle assembly includes a bracket, a first handle, and a second handle. The bracket is configured to be movably coupled to a housing of the computing device. The first handle is movably coupled to the bracket and is first handle being movable between an insertion orientation and an ejection orientation. The second handle is movably coupled to the bracket and is movable between a locked orientation and an unlocked orientation. The second handle includes a locking structure configured to lock the expansion card within the housing. When the bracket is coupled to the housing, movement of the first handle between the insertion orientation and the ejection orientation causes the bracket and the second handle to move linearly within the housing. Movement of the second handle between the locked orientation and the unlocked orientation causes the locking structure to move between a locked position and an unlocked position.

In some aspects of the first implementation, the first handle is rotatably coupled to the bracket and rotates between the insertion orientation and the ejection orientation.

In some aspects of the first implementation, when the expansion card is at least partially inserted into the housing of the computing device, rotation of the first handle between the insertion orientation and the ejection orientation causes the expansion card to move linearly within the housing.

In some aspects of the first implementation, when the expansion card is at least partially inserted into the housing of the computing device and the locking structure engages the expansion card, rotation of the first handle from the ejection orientation to the insertion orientation causes the locking structure to move linearly and push the expansion card in a first linear direction within the housing.

In some aspects of the first implementation, when the expansion card is fully inserted into the computing device, rotation of the first handle from the insertion orientation to the ejection orientation causes the bracket to move linearly and push the expansion card in a second linear direction within the housing that is opposite the first linear direction.

In some aspects of the first implementation, the first handle includes a channel defined therein and the bracket includes an aperture defined therein. The first handle is coupled to the bracket via a pin that extends through the channel and the aperture. Rotation of the first handle between the insertion orientation and the ejection orientation causes the pin to slide within the channel and move the bracket linearly.

In some aspects of the first implementation, the second handle is rotatably coupled to the bracket and rotates between the locked orientation and the unlocked orientation.

In some aspects of the first implementation, when the expansion card is at least partially inserted into the computing device, rotation of the second handle between the locked orientation and the unlocked orientation causes the locking structure to engage or disengage the expansion card.

In some aspects of the first implementation, when the expansion card is at least partially inserted into the computing device, rotation of the second handle from the locked orientation to the unlocked orientation causes the locking structure to move to the unlocked position and away from the expansion card such that the locking structure disengages the expansion card.

In some aspects of the first implementation, when the expansion card is at least partially inserted into the computing device, rotation of the second handle from the unlocked orientation to the locked orientation causes the locking structure to move to the locked position and toward the expansion card such that the locking structure engages the expansion card.

In some aspects of the first implementation, the locking structure includes a projection extending from the second handle. The projection extends through a gap in the expansion card when the expansion card is at least partially inserted into the computing device and the locking structure is in the locked position.

In some aspects of the first implementation, the projection has a curved surface that is configured to contact a front edge of the expansion card in response to the expansion card being inserted into the computing device when the locking structure is in the locked position.

In some aspects of the first implementation, the contact between the curved surface of the projection and the front edge of the expansion card causes the locking structure to move from the locked position to the unlocked position.

In some aspects of the first implementation, the second handle is biased toward the locked orientation such that in response to a gap in the expansion card aligning with the projection as the expansion card is further inserted into the housing, the locking structure moves from the unlocked position to the locked position such that the projection extends through the gap in the expansion card.

In a second implementation, the present disclosure is directed to a method for inserting an expansion card into a computing device using a handle assembly. The method includes moving the expansion card to an initial position within a housing of the computing device to cause a locking structure of the handle assembly to move from a locked position to an unlocked position. The method further includes moving the expansion card from the initial position within the housing to an intermediate position within the housing to cause the locking structure to move from the unlocked position to the locked position and engage the expansion card. The method further includes moving a handle of the handle assembly from an ejection orientation to an insertion orientation to cause the expansion card to move to a final position within the housing. At least a portion of the expansion card is received by a connector of the computing device when the expansion card is in the final position.

In some aspects of the second implementation, the locking structure has a curved surface that contacts a front edge of the expansion card in response to the expansion card being moved to the initial position. The contact between the curved surface of the locking structure and the front edge of the expansion card causes the locking structure to move away from the expansion card and to the unlocked position.

In some aspects of the second implementation, the locking structure is biased toward the locked position. When the expansion card is in the intermediate position, a gap defined in the expansion card is aligned with the locking structure, such that the locking structure moves from the unlocked position to the unlocked position in response to the expansion card moving to the intermediate position.

In a third implementation, the present disclosure is directed to a method for removing an expansion card from a computing device using a handle assembly. The method includes moving a first handle of the handle assembly from an insertion orientation to an ejection orientation to disconnect the expansion card from a connector of the computing device. The method further includes moving a second handle of the handle assembly from a locked orientation to an unlocked orientation to disengage a locking structure of the handle assembly from the expansion card. The method further includes removing the expansion card from a housing of the computing device.

In some aspects of the third implementation, the handle assembly includes a bracket coupled to the first handle. Moving the first handle from the insertion orientation to the ejection orientation causes the bracket to move linearly and push the expansion card away from the connector of the computing device.

In some aspects of the third implementation, moving the second handle from the locked orientation to the unlocked orientation causes the locking structure to be removed from a gap defined in the expansion card.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

DETAILED DESCRIPTION

Figure 1A:
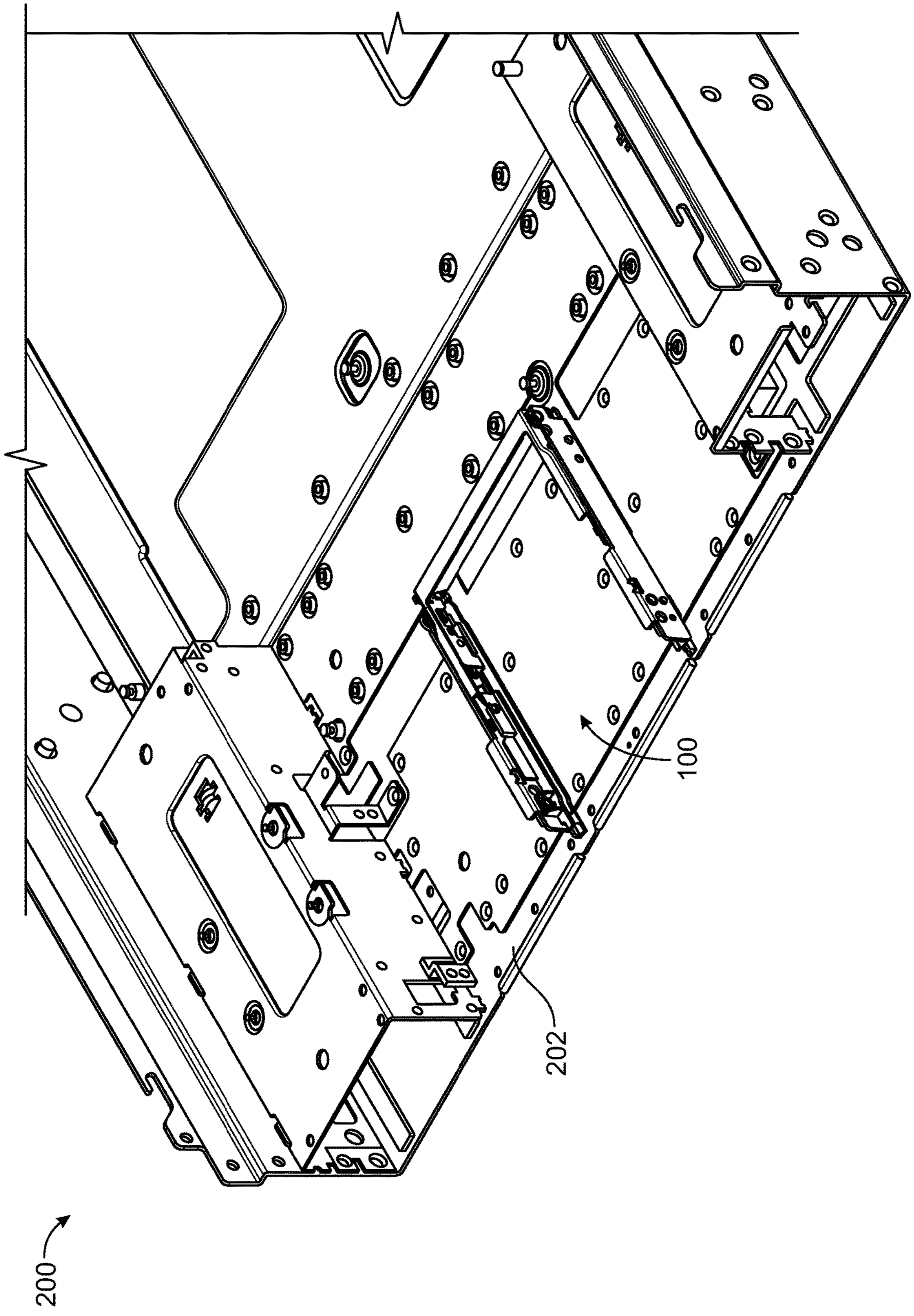
FIG. 1A is a perspective view of a handle assembly coupled to a housing of a computing device, according to aspects of the present disclosure.

Computing systems and devices often include a variety of electronic components, including expansion cards that can be inserted into connectors on the motherboard of the computing device. According to aspects of the present disclosure, a handle assembly can be used to aid in inserting an expansion card into the computing device and connecting the expansion card to the connector, and to aid in disconnecting the expansion card from the connector removing the expansion card from the computing device. The handle assembly also aids in securing the expansion card within the computing device. The handle assembly includes a first handle that is movable between an insertion orientation an ejection orientation. The first handle can be moved to the insertion orientation to cause the expansion card to be inserted into the connector. The first handle can be moved to the ejection orientation to remove the expansion card from the connector. The handle assembly also includes a second handle that is movable between a locked orientation and an unlocked orientation. The second handle can be moved to the locked orientation to lock the expansion card within the computing device, so that the expansion card cannot be removed from the computing device, even if the first handle has moved to the ejection orientation and the expansion card has been disconnected from the connector. The second handle can be moved to the unlocked orientation to unlock the expansion card from the computing device, so that the expansion card can be removed from the computing device.

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

FIG. 1A is a perspective view of a computing device 200 that includes a housing 202 and a handle assembly 100 that can be disposed within and coupled to the housing 202. A variety of different electronic components can be disposed within the housing 202, such as a motherboard, processing units (e.g., a central processing unit (CPU) or a graphics processing unit (GPU)), memory devices, communication interfaces, etc. An expansion card (not shown) can also be inserted into the housing 202 and connected to a connector on the motherboard of the computing device. The handle assembly 100 can be used to insert and remove the expansion card from the housing 202.

Figure 1B:
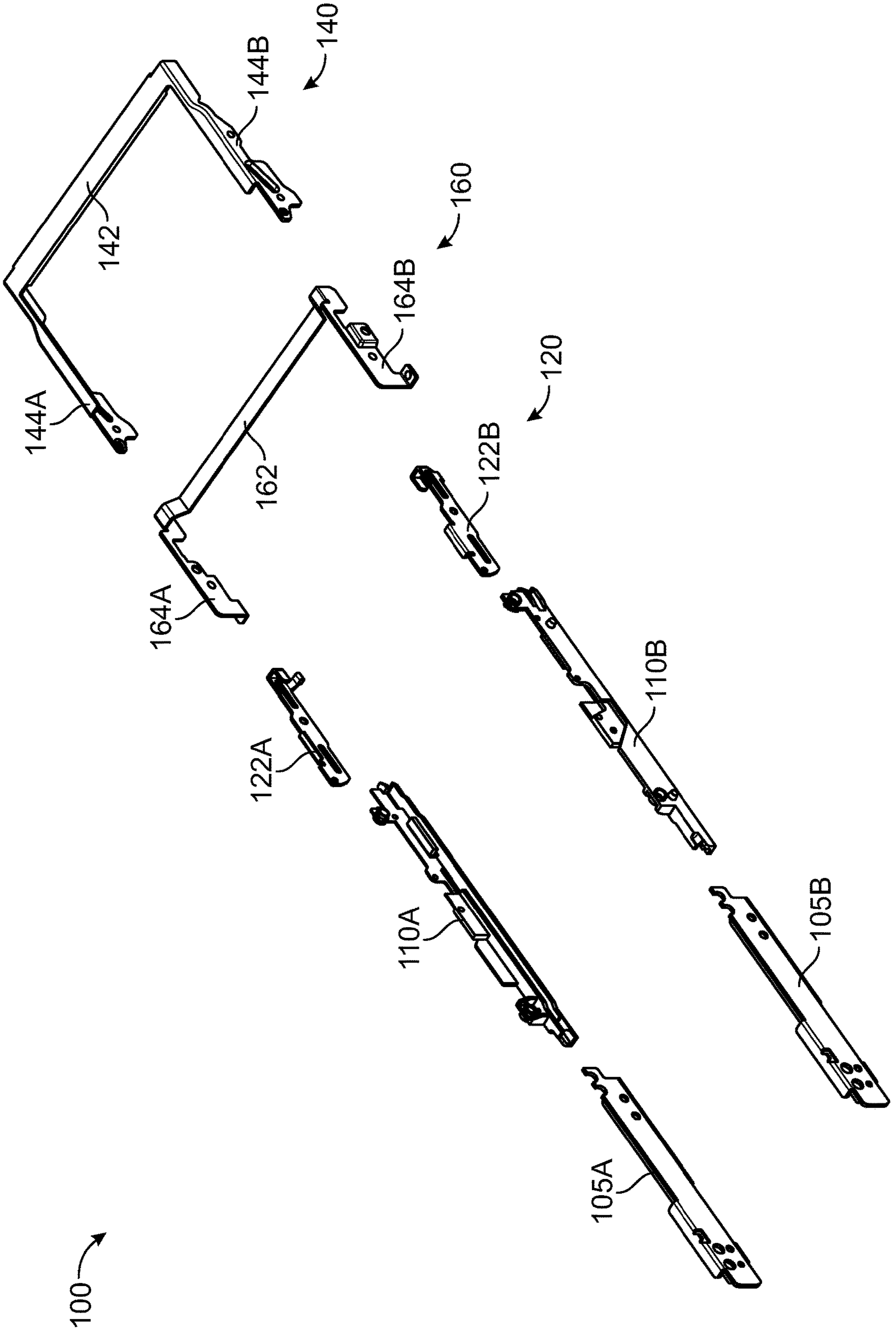
FIG. 1B is an exploded view of the handle assembly, according to aspects of the present disclosure.

FIG. 1B is an exploded view of the handle assembly 100. In the illustrated implementation, the handle assembly 100 includes a first pair of rails 105A and 105B, a second pair of rails 110A and 110B, a bracket 120 formed from a first bracket portion 122A and a second bracket portion 122B, a first handle 140, and a second handle 160. One or both of the first pair of rails 105A and 105B and the second pair of rails 110A and 110B can be coupled to the housing 202 (FIG. 1A) of the computing device 200 (FIG. 1A).

The bracket 120 can be coupled to the first pair of rails 105A and 105B, and/or the second pair of rails 110A and 110B such that the bracket 120 is movable relative to the housing 202. For example, the first bracket portion 122A can be coupled to the rail 105A and/or the rail 110A, while the second bracket portion 122B can be coupled to the rail 105B and/or the rail 110B. One or both of the rail 105A and the rail 110A can be coupled to the housing 202, and one or both of the rail 105B and the rail 110B can be coupled to the housing 202. Generally, the rails 110A and 110B provide ledges on which the expansion card will slide when it is inserted into the housing 202 of the computing device 200.

In some implementations, the handle assembly 100 includes only the first pair of rails 105A and 105B, only the second pair of rails 110A and 110B, or neither of the pair of rails 105A, 105B, 110A, and 110B. In implementations that do not include any rails, the bracket 120 can be coupled directly to the housing 202.

The first handle 140 and the second handle 160 are each movably coupled to the bracket 120. The first handle 140 includes a body 142, a first leg 144A, and a second leg 144B. In the illustrated implementation, the first leg 144A of the first handle 140 is rotatably coupled to the first bracket portion 122A, and the second leg 144B of the first handle 140 is rotatably coupled to the second bracket portion 122B. Thus, the first handle 140 is rotatably coupled to the bracket 120 and can rotate to various different positions. In some implementations, the first handle 140 can rotate between an insertion orientation and an ejection orientation.

The second handle 160 is formed similarly to the first handle 140, and includes a body 162, a first leg 164A, and a second leg 164B. In the illustrated implementation, the first leg 164A of the second handle 160 is rotatably coupled to the first bracket portion 122A, and the second leg 164B of the second handle 160 is rotatably coupled to the second bracket portion 122B. Thus, the second handle 160 is also rotatably coupled to the bracket 120 and can rotate to various different positions. In some implementations, the second handle 160 can rotate between a locked orientation and an unlocked orientation, which moves a locking structure of the second handle 160 between a locked position and an unlocked position.

FIGS. 2A-4B illustrate how the handle assembly 100 is assembled. While the second handle 160 is shown being coupled to the bracket 120 prior to the first handle 140, the first handle 140 could be coupled to the bracket 120 prior to the second handle 160 in some implementations. Further, FIGS. 2A-4B generally only show the rail 110A, first bracket portion 122A, the first leg 144A of the first handle 140, and the first leg 164A of the second handle 160. However, pair of rails 110A and 110B, the bracket 120, the first handle 140, and the second handle 160 are generally symmetrical. Thus, the rail 110A is generally identical to the rail 110B, the first bracket portion 122A is generally identical to the second bracket portion 122B, the first leg 144A is generally identical to the second leg 144B, and the first leg 164A is generally identical to the second leg 164B. If any of the rail 110A, the first bracket portion 122A, the first leg 144A, and the first leg 164A is described as having a certain feature and/or performing a certain function, then the second bracket portion 122B, the second leg 144B, and the second leg 164B will generally also have that component and/or perform that function. Further, the process for coupling together the rail 110A, the first bracket portion 122A, the first leg 144A, and the first leg 164A, is generally identical to the process for coupling together the rail 110B, the second bracket portion 122B, the second leg 144B, and the second leg 164B. However, in some implementations, the various components of the handle assembly 100 may not be symmetrical, such that the corresponding parts of the rails 110A and 110B, the bracket 120, the first handle 140, and the second handle 160 may differ from each other in a variety of ways.

Figure 2B:
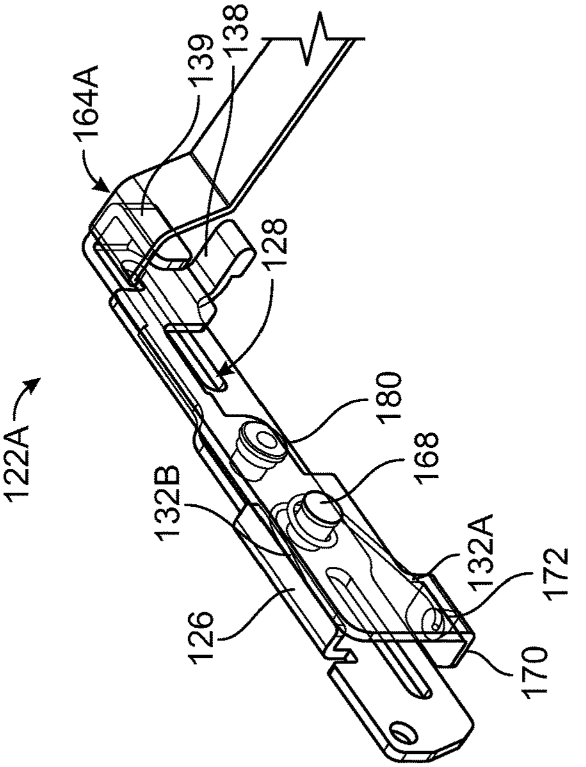
FIG. 2B is a perspective view of the first step for assembling the handle assembly, according to aspects of the present disclosure.
Figure 2A:
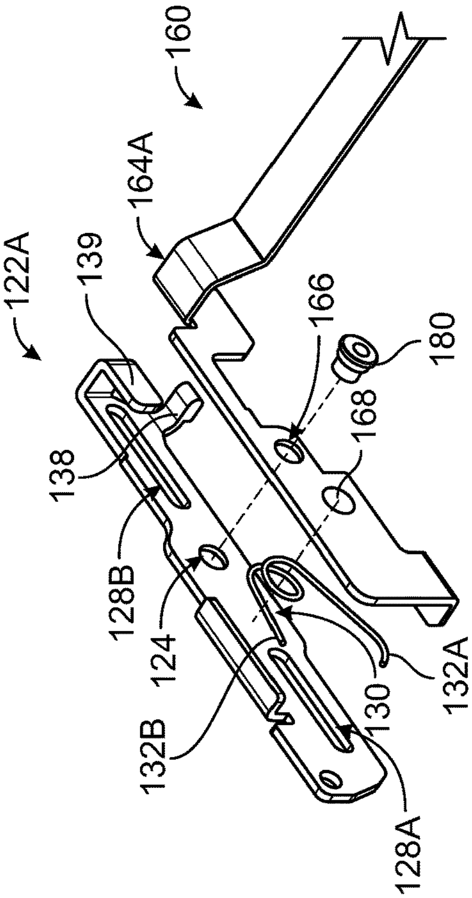
FIG. 2A is an exploded view of a first step for assembling the handle assembly, according to aspects of the present disclosure.

FIG. 2A shows the alignment between the first bracket portion 122A of the bracket 120 and the first leg 164A of the second handle 160, prior to the first bracket portion 122A being coupled to the first leg 164A. FIG. 2B shows the first bracket portion 122A and the first leg 164A after the first bracket portion 122A has been coupled to the first leg 164A. A pin 180 can be inserted through an aperture 124 that is defined in the first bracket portion 122A, and through an aperture 166 that is defined in the first leg 164A, in order to couple the first bracket portion 122A and the first leg 164A. The pin 180 is able to rotate within the aperture 124 and/or the aperture 166, such that the first bracket portion 122A and the first leg 164A are able to rotate relative to each other.

A torsion spring 130 is disposed between the first bracket portion 122A and the first leg 164A. The first leg 164A includes a boss member 168 extending from the first leg 164A toward the first bracket portion 122A and through the center of the torsion spring 130. A first leg 132A of the torsion spring 130 rests against a ledge 170 of the first leg 164A. A second leg 132B of the torsion spring 130 rests against a ledge 126 of the first bracket portion 122A. If the first leg 164A of the second handle 160 is rotated relative to the first bracket portion 122A such that the ledge 170 moves closer toward the ledge 126, the first leg 132A and the second leg 132B of the torsion spring 130 will compress. The compression of the torsion spring 130 will cause the torsion spring 130 to impart a corresponding spring force against the ledges 126 and 170, causing the first leg 164A of the second handle 160 to rotate back to its original position. Thus, the torsion spring 130 aids in biasing the second handle 160 to a position (relative to the first bracket portion 122A) where the torsion spring 130 is not compressed.

As shown in FIGS. 2A and 2B, the first bracket portion 122A also includes a pair of rail channels 128A and 128B. As discussed further herein, the rail channels 128A and 128B are used to couple the first bracket portion 122A to the rail 110A of the second pair of rails. While not shown in FIGS. 2A and 2B, the second bracket portion 122B will have a pair of rail channels that is similar to the pair of rail channels 128A and 128B, and will be used to couple the second bracket portion 122B to the rail 110B of the second pair of rails. The first bracket portion 122A also includes an ejection arm 138 and a stopping tab 139. The ejection arm 138 aids in disconnecting the expansion card from the connector of the motherboard and the stopping tab 139 aids in preventing the first handle 140 from rotating past the unlocked orientation, both of which are discussed in more detail herein. Finally, FIG. 2B shows a projection 172 that extends downward from the ledge 170. When the first leg 164A is coupled to the first bracket portion 122A, the projection 172 of the first leg 164A will extend from the ledge 170 away from the first bracket portion 122A.

Figure 3B:
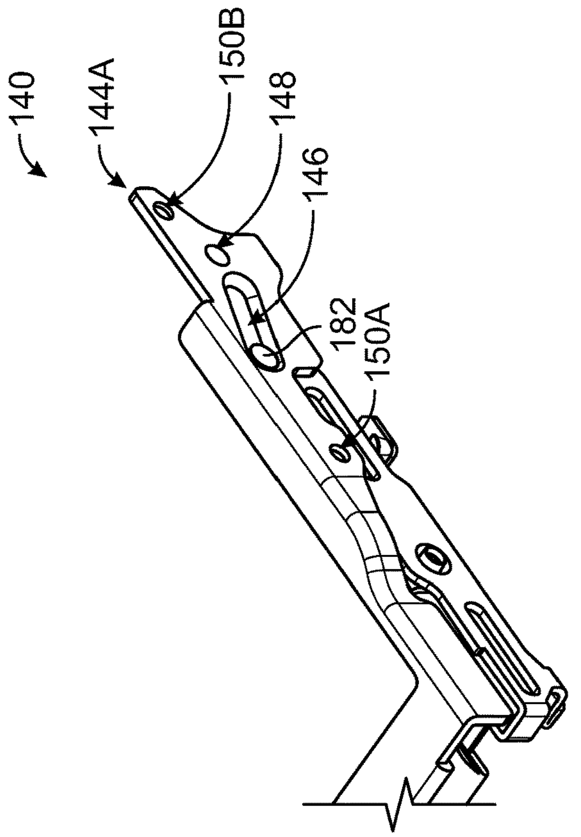
FIG. 3B is a perspective view of the second step for assembling the handle assembly, according to aspects of the present disclosure.
Figure 3A:
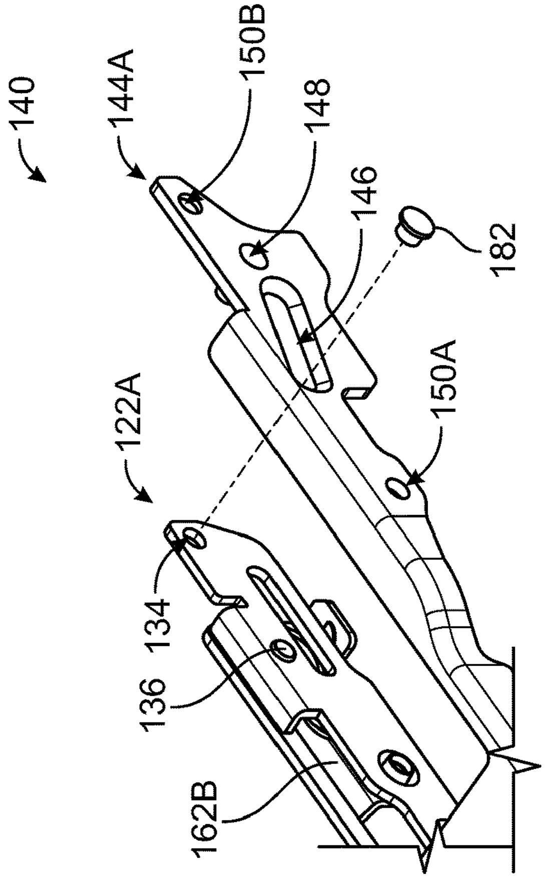
FIG. 3A is an exploded view of a second step for assembling the handle assembly, according to aspects of the present disclosure.

FIG. 3A shows the alignment between the first bracket portion 122A and the first leg 144A of the first handle 140, prior to the first bracket portion 122A being coupled to the first leg 144A (and after the first leg 164A of the second handle 160 has been coupled to the first bracket portion 122A). FIG. 3B shows the first bracket portion 122A and the first leg 144A after the first bracket portion 122A has been coupled to the first leg 144A. As can be seen in FIGS. 3A and 3B, the first leg 144A and the first leg 164A will be disposed on opposite sides of the first bracket portion 122A when the legs 144A and 164A have been coupled to the first bracket portion 122A.

The first bracket portion 122A includes an aperture 134, and the first leg 144A includes a channel 146. A pin 182 can be inserted through the aperture 134 and the channel 146 that is defined in the first leg 144A, in order to couple the first bracket portion 122A and the first leg 144A. The pin 182 is able to rotate within the aperture 134 and/or the channel 146, such that the first bracket portion 122A and the first leg 144A are able to rotate relative to each other. As this rotation occurs, the pin 182 moves through the channel 146. The first bracket portion 122A also includes a detent 136 that aids in settings different positions of the first handle 140 during use of the handle assembly 100.

Finally, the first leg 144A of the first handle 140 includes a boss member 148, and a pair of detent apertures 150A and 150B. The boss member 148 is used to couple the first handle 140 to the second pair of rails 110A and 110B, as is described further herein. The two detent apertures 150A and 150B also aid in setting different positions of the first handle 140 during use of the handle assembly 100. As described further herein, the detent aperture 150B can receive the detent 136 of the first bracket portion 122A when the first handle 140 is in a certain position.

Figure 4B:
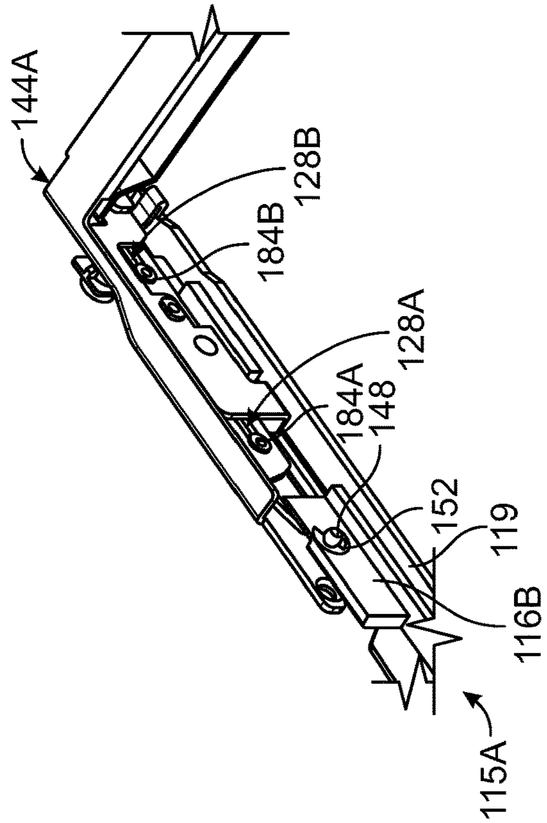
FIG. 4B is a perspective view of the third step for assembling the handle assembly, according to aspects of the present disclosure.
Figure 4A:
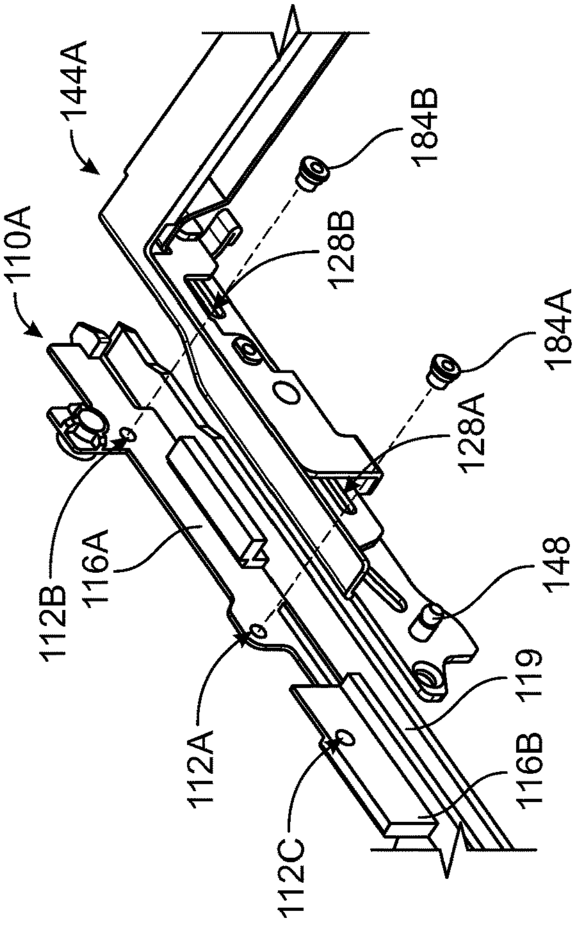
FIG. 4A is an exploded view of a third step for assembling the handle assembly, according to aspects of the present disclosure.

FIGS. 4A and 4B illustrate how the bracket 120, the first handle 140, and the second handle 160 are all coupled to the second pair of rails 110A and 110B. FIG. 4A shows the alignment between the rail 110A, the first bracket portion 122A, the first leg 144A, and the first leg 164A, prior to the rail 110A being attached. FIG. 4B shows the first bracket portion 122A and the first leg 164A after the first bracket portion 122A has been coupled to the first leg 164A. The rail 110A includes an outer wall 116A and an inner wall 116B. The outer wall 116A defines a first aperture 112A and a second aperture 112B, and the inner wall 116B defines a third aperture 112C. The rail 110A also includes a ledge 119, which the expansion card will slide upon when being inserted into the computing device.

A pin 184A is inserted through the first aperture 112A of the outer wall 116A, and through the rail channel 128A of the first bracket portion 122A. A pin 184B is inserted through the second aperture 112B of the outer wall 116A, and through the rail channel 128B of the first bracket portion 122A. As shown in FIG. 4B, the first bracket portion 122A and the first leg 144A will generally be disposed inside of the outer wall 116A of the rail 110A, relative to the handle assembly 100. Thus, the first bracket portion 122A and the first leg 144A will be positioned between the outer wall 116A of the rail 110A and the rail 110B when the handle assembly 100 is fully assembled. The pins 184A and 184B are able to slide within the rail channels 128A and 128B, respectively. Thus, the first bracket portion 122A is slidable relative to the rail 110A. Because the second handle 160 is rotationally coupled to the first bracket portion 122A (and the second bracket portion 122B), the second handle 160 is also slidable relative to the rail 110A (and the rail 110B).

The boss member 148 of the first leg 144A of the first handle 140 is used to couple the first leg 144A to the rail 110A. As shown, the boss member 148 is inserted into the third aperture 112C of the inner wall 116B of the rail 110A, to couple the first leg 144A to the rail 110A. As shown in FIG. 4B, the inner wall 116B will generally be disposed inside of the first leg 144A of the first handle 140, relative to the handle assembly 100. Thus, the inner wall 116B will be positioned between the first leg 144A and the second leg 144B when the handle assembly 100 is fully assembled. The outer wall 116A is positioned on the outside (relative to the handle assembly 100) of one end of the first leg 144A, and the inner wall 116B is positioned on the inside (relative to the handle assembly 100) of one end of the first leg. A fastener 152 can be secured to the end of the boss member 148 that protrudes from the inside of the inner wall 116B. Any suitable device can be used for the fastener 152, such as a pin, a circlip, a snap ring, a retaining ring, etc. The boss member 148 is able to rotate within the third aperture 112C. Thus, the first leg 144A (and therefore the first handle 140) is rotatable relative to the rail 110A.

As noted herein, FIGS. 2A-5B only show the components of half of the handle assembly 100. In some implementations, various features of these components will be duplicated on the other half of the handle assembly 100. For example, the handle assembly 100 can include two torsion springs 130, one positioned between the first bracket portion 122A and the first leg 164A of the second handle 160, the other positioned between the second bracket portion 122B and the second leg 164B of the second handle 160. In another example, the bracket 120 can includes two ejection arms 138, one ejection arm 138 extending from each of the bracket portions 122A and 122B. In a further example, in some implementations, the second handle 160 includes two projections 172, one projection 172 extending from each of the legs 164A, 164B of the second handle 160. One or both of the projections 172 of the second handle 160 can form the locking structure of the second handle 160 that aids in locking the expansion card within the computing device, as is discussed further herein.

Figure 5B:
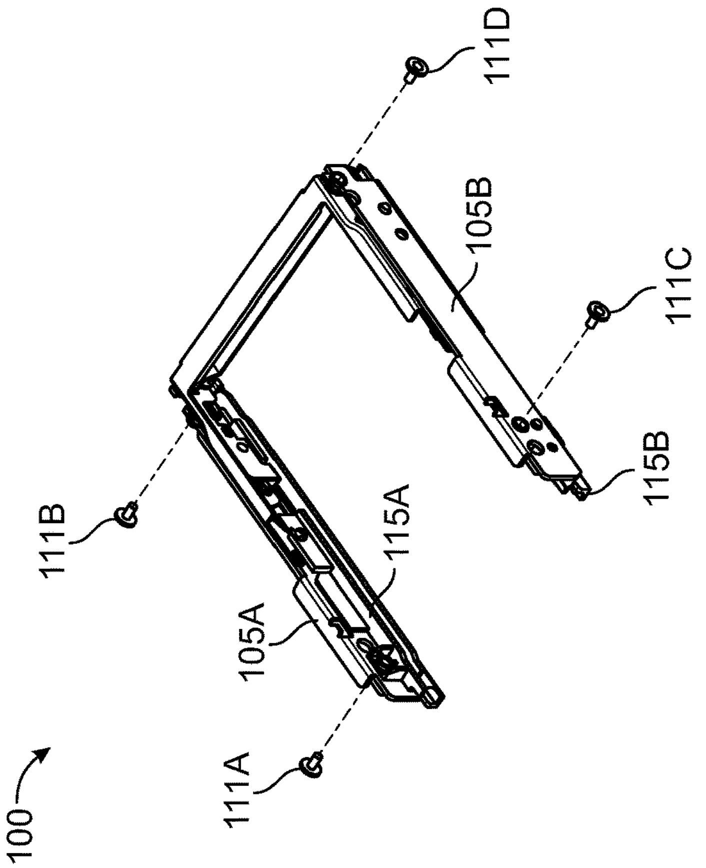
FIG. 5B is a perspective view of the fourth step for assembling the handle assembly, according to aspects of the present disclosure.
Figure 5A:
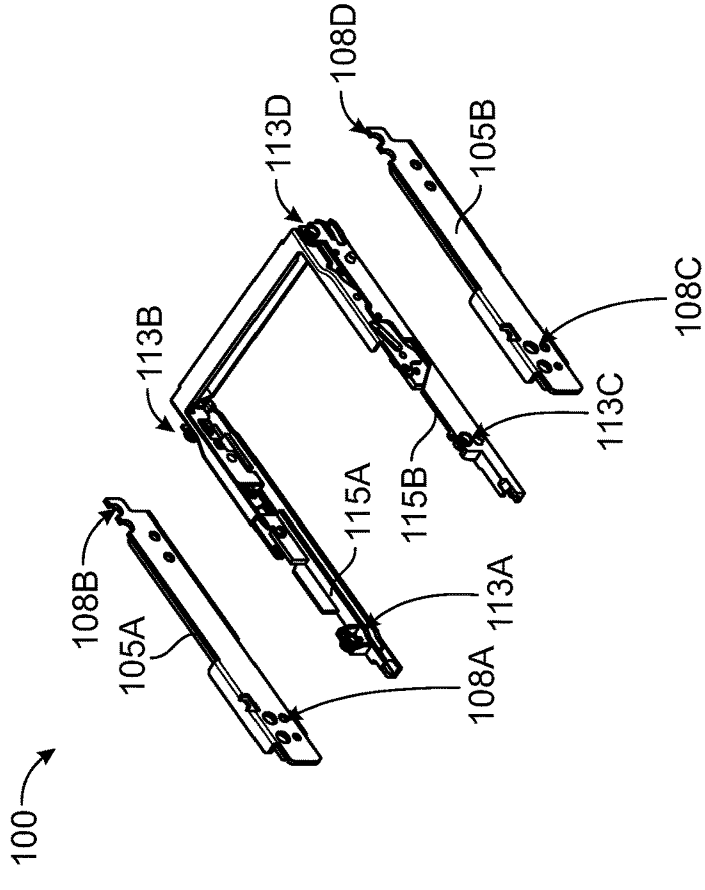
FIG. 5A is an exploded view of a fourth step for assembling the handle assembly, according to aspects of the present disclosure.

FIGS. 5A and 5B illustrate how the first pair of rails 105A and 105B is coupled to the second pair of rails 110A and 110B. FIG. 5A shows the alignment between rail 105A and rail 110A and between rail 105B and rail 110B, prior to the first pair of rails 105A and 105B being coupled to the second pair of rail 110A and 110B. Rail 105A includes a pair of apertures 108A and 108B, while rail 105B includes a pair of apertures 108C and 108D. Rail 110A includes a pair of apertures 113A and 113B that align with apertures 108A and 108B, while rail 110B includes a pair of apertures 113C and 113D that align with apertures 108C and 108D. As shown in FIG. 5B, pins can be inserted through these pairs of apertures to couple the rail 105A to the rail 110A, and to couple the rail 105B to the rail 110B. Pin 111A is inserted through aperture 108A and aperture 113A. Pin 111B is inserted through aperture 108B and aperture 113B. Pin 111C is inserted through aperture 108C and aperture 113C. Pin 111D is inserted through aperture 108D and aperture 113D.

Figure 6A:
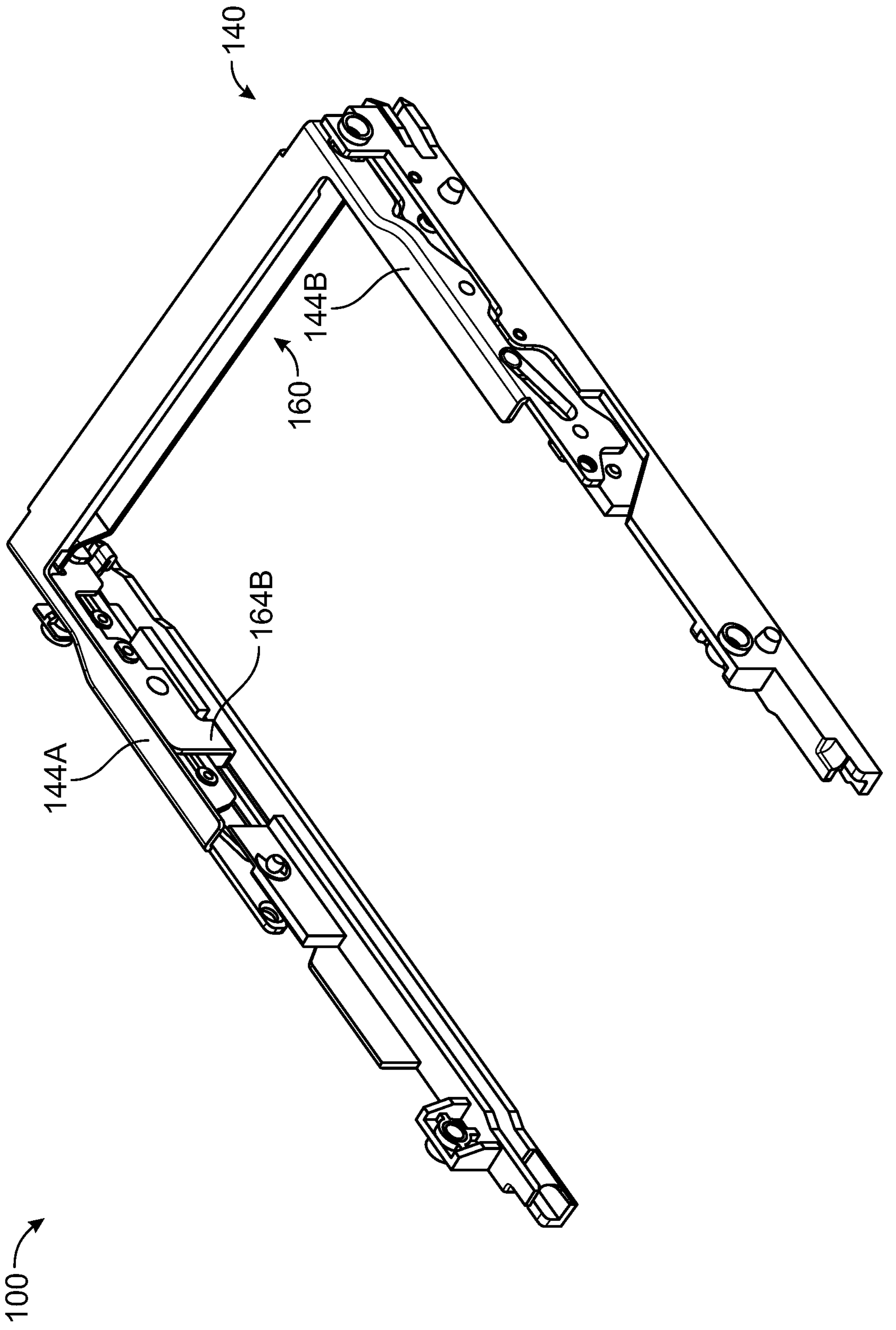
FIG. 6A is a perspective view of the handle assembly when a first handle is in an insertion orientation and a second handle is in a locked orientation, according to aspects of the present disclosure.

FIG. 6A shows a perspective view of the handle assembly 100 when the first handle 140 is in the insertion orientation, and the second handle 160 is in the locked orientation. For ease of illustration, the first pair of rails 105A and 105B are not shown in FIG. 6A. When the first handle 140 is in the insertion orientation, the first leg 144A and the second leg 144B are generally parallel to and aligned with the second pair of rails 110A and 110B. Similarly, when the second handle 160 is in the locked orientation, the first leg 164A and the second leg 164B (not visible in FIG. 6A) are generally parallel to and aligned with the second pair of rails 110A and 110B.

Figure 6B:
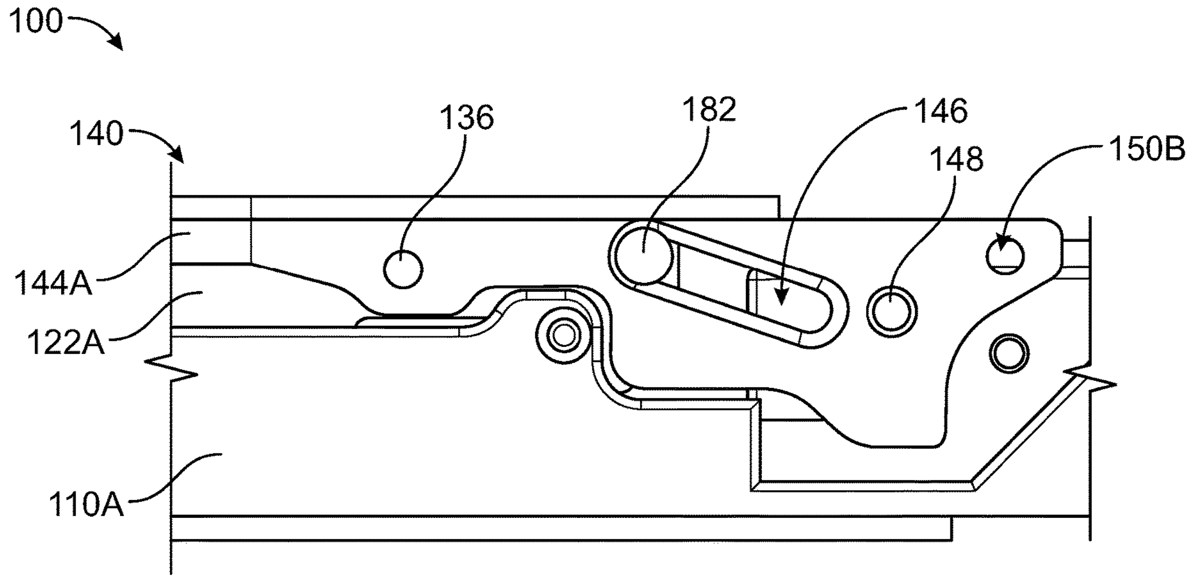
FIG. 6B is a side view of the handle assembly of FIG. 6A, according to aspects of the present disclosure.
Figure 6C:
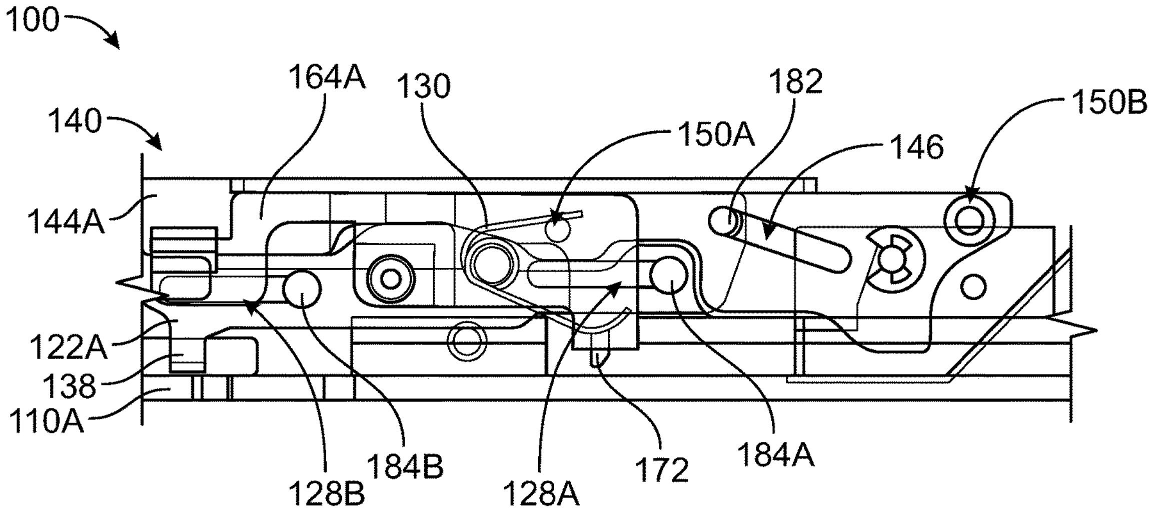
FIG. 6C is a transparent side view of the handle assembly of FIG. 6A, according to aspects of the present disclosure.

FIGS. 6B and 6C show side views of the handle assembly 100 when the first handle 140 is in the insertion orientation, and the second handle 160 is in the locked orientation. FIG. 6C is a transparent view that shows the first leg 164A of the second handle 160 underneath the first leg 144A of the first handle 140. When the first handle 140 is in the insertion orientation, the detent aperture 150A (shown in FIG. 6C) of the first leg 144A receives the detent 136 (shown in FIG. 6B) of the first bracket portion 122A. The detent 136 does not prevent the first handle 140 from moving out of the insertion orientation, but does provide a small amount of resistance to prevent inadvertent movement out of the insertion orientation. The detent 136 also provides a small amount of tactile feedback when received in the detent aperture 150A, to indicate that the first handle 140 has reached the insertion orientation. When the first handle is in the insertion orientation, the pin 182 that couples the first leg 144A and the first bracket portion 122A is disposed at an end of the channel 146 that is closer to the detent aperture 150A, and further away from the boss member 148 (which couples the first leg 144A and the rail 110A) and the detent aperture 150B.

As shown in FIG. 6C, the torsion spring 130 is uncompressed, and is thus imparts no force (or a minimal amount of force) on the first bracket portion 122A and the first leg 164A of the second handle 160. FIG. 6C also shows the position of the pins 184A and 184B within the rail channels 128A and 128B of the first bracket portion 122A. The first bracket portion 122A and the first leg 164A are positioned as far in one direction relative to the rail 110A (e.g., leftward relative to the plane of FIG. 6C) as possible. The ejection arm 138 of the first bracket portion 122A, and the projection 172 of the first leg 164A are also positioned as far in one direction relative to the rail 110A as possible. The pins 184A and 184B are thus disposed at the end of their respective rail channels 128A and 128B that is closer toward the connection point between the legs 144A and 144B of the first handle 140, and the rails 110A and 110B. When the second handle 160 is in the locked orientation, the projection 172 is in the locked position.

Figure 7A:
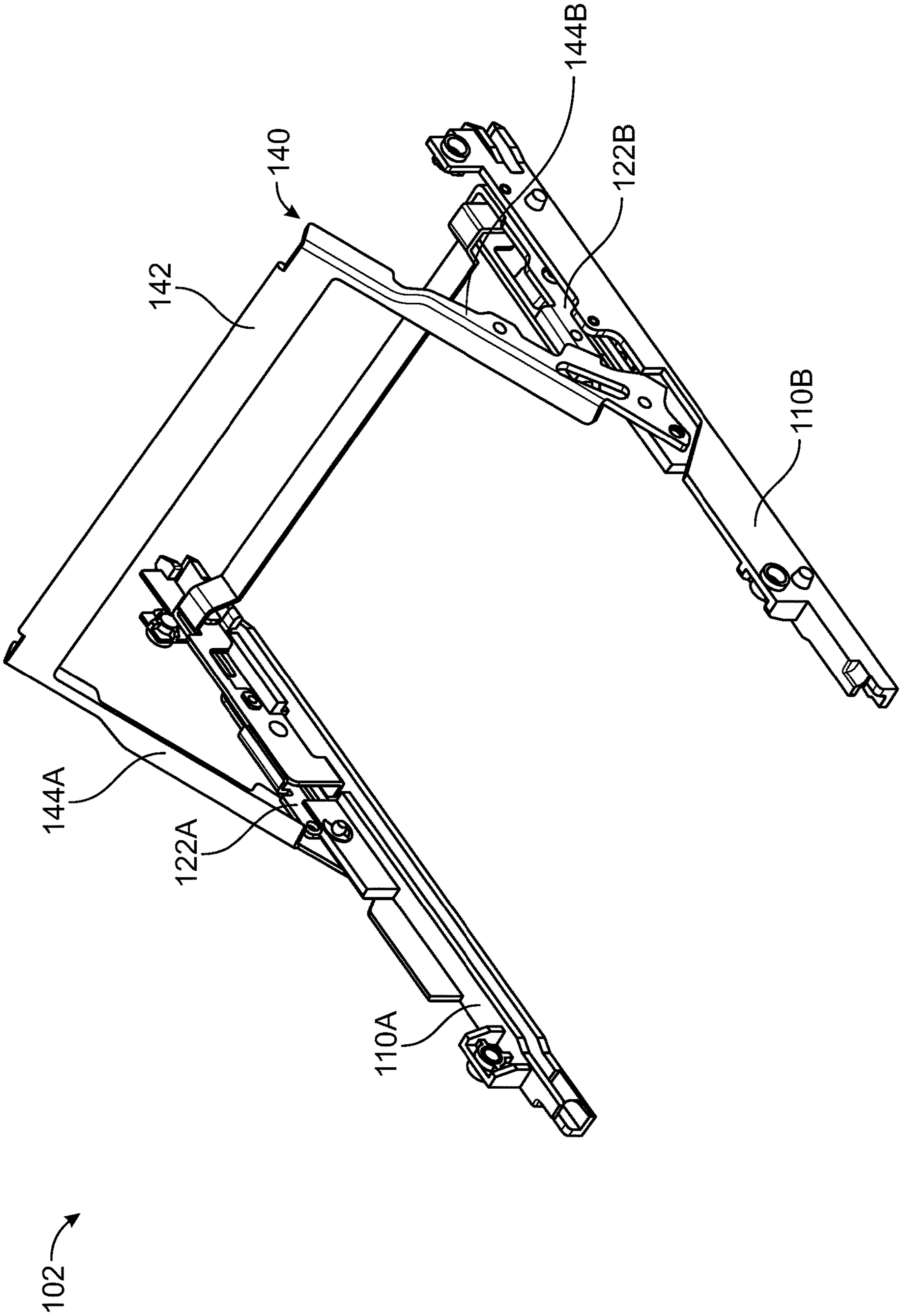
FIG. 7A is a perspective view of the handle assembly when the first handle is in an ejection orientation and the second handle is in the locked orientation, according to aspects of the present disclosure.

FIG. 7A shows a perspective view of the handle assembly 100 when the first handle 140 has been rotated to the ejection orientation, and the second handle 160 remains in the locked orientation. When the first handle 140 is in the ejection orientation, the body 142, the first leg 144A, and the second leg 144B are positioned at an angle relative to the rail 110A, the rail 110B, first bracket portion 122A, and the second bracket portion 122B.

Figure 7B:
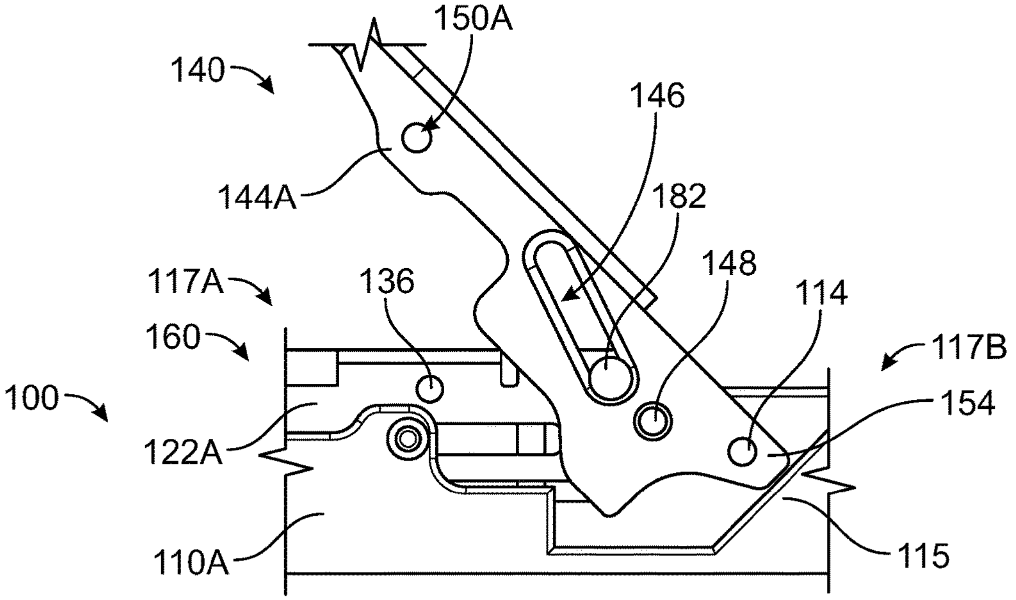
FIG. 7B is a side view of the handle assembly of FIG. 7A, according to aspects of the present disclosure.
Figure 7C:
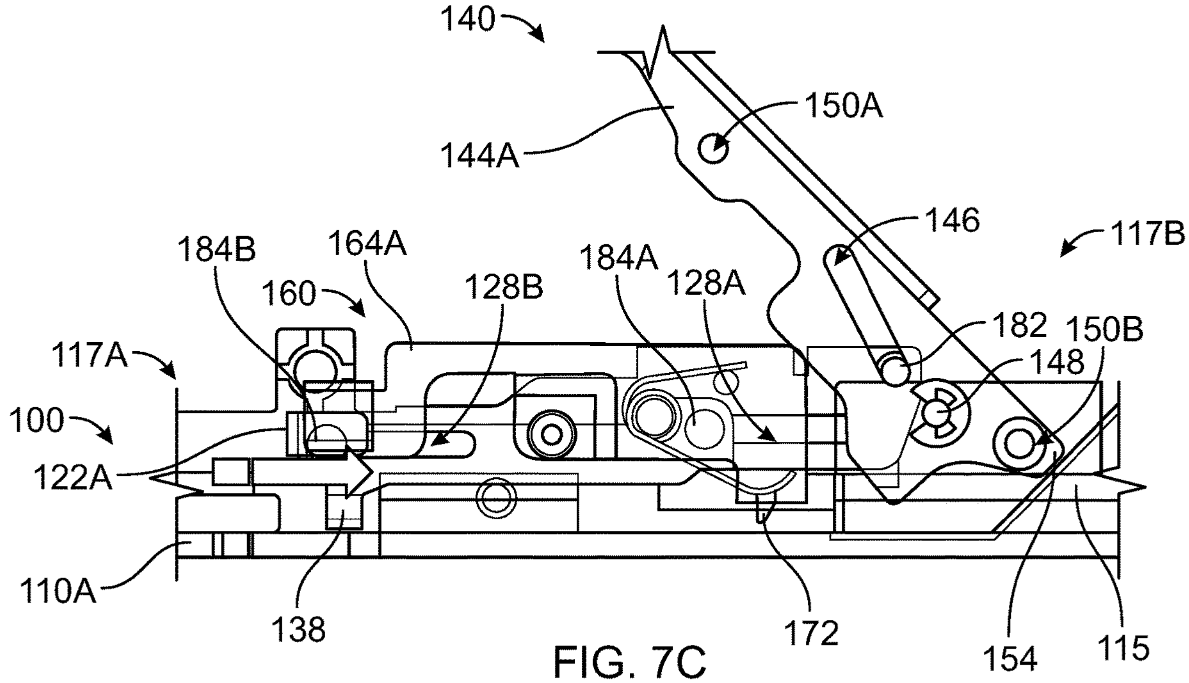
FIG. 7C is a transparent side view of the handle assembly of FIG. 7A, according to aspects of the present disclosure.

FIGS. 7B and 7C show side views of the handle assembly 100 when the first handle 140 has been rotated to the ejection orientation, and the second handle 160 remains in the locked orientation. FIG. 7C is a transparent view that shows the second handle 160 underneath the first handle 140. As shown, the first leg 144A has pivoted about the boss member 148, such that the detent aperture 150A of the first leg 144A has moved away from the detent 136 of the first bracket portion 122A, which is no longer received in the detent aperture 150A. The detent aperture 150B of the first leg 144A has moved toward the rail 110A, such that a detent 114 of the rail 110A is received within the detent aperture 150B.

Similar to the detent 136, the detent 114 does not prevent the first handle 140 from moving out of the ejection orientation, but does provide a small amount of resistance to prevent inadvertent movement out of the ejection orientation. The detent 114 also provides a small amount of tactile feedback when received in the detent aperture 150B, to indicate that the first handle 140 has reached the ejection orientation. The rail 110A includes a stopping surface 115. When the first handle 140 moves to the ejection orientation, a terminal end 154 of the first leg 144A contacts the stopping surface 115. The contact between the stopping surface 115 and the terminal end 154 prevents the first handle 140 from rotating past the ejection orientation, which could damage the handle assembly 100.

As the first handle 140 rotates to the ejection orientation, the first leg 144A rotates away from the rail 110A. However, the first bracket portion 122A is not able to rotate away from the rail 110A with the first leg 144A, because the first bracket portion 122A is not rotatably coupled to the rail 110A. Instead, as the first leg 144A rotates, the pin 182 (which couples the first bracket portion 122A to the first leg 144A) moves to the end of the channel 146 that is closer to the boss member 148 and the detent aperture 150B. The pin 182 pulls the first bracket portion 122A in a linear direction relative to the rail 110A, such that the first bracket portion 122A slides along the pins 184A and 184B (which couple the first bracket portion 122A to the rail 110A). The first bracket portion 122A (and the ejection arm 138 of the first bracket portion 122A) thus moves away from a first end 117A of the rail 110A, and toward a second end 117B of the rail 110A. When the first handle 140 reaches the ejection orientation, the pins 184A and 184B have moved to the opposite ends of the rail channels 128A and 128B.

As the first bracket portion 122A slides along the pins 184A and 184B, the first bracket portion 122A pulls the first leg 164A of the second handle 160 therewith. The first leg 164A thus also moves in a linear direction relative to the rail 110A when the first handle 140 moves to the ejection orientation. The projection 172 of the first leg 164A moves away from the first end 117A of the rail 110A and toward the second end 117B of the rail 110A with the first leg 164A and the first bracket portion 122A. And because the second handle 160 is still in the locked orientation, the projection 172 remains in the locked position.

Figure 8A:
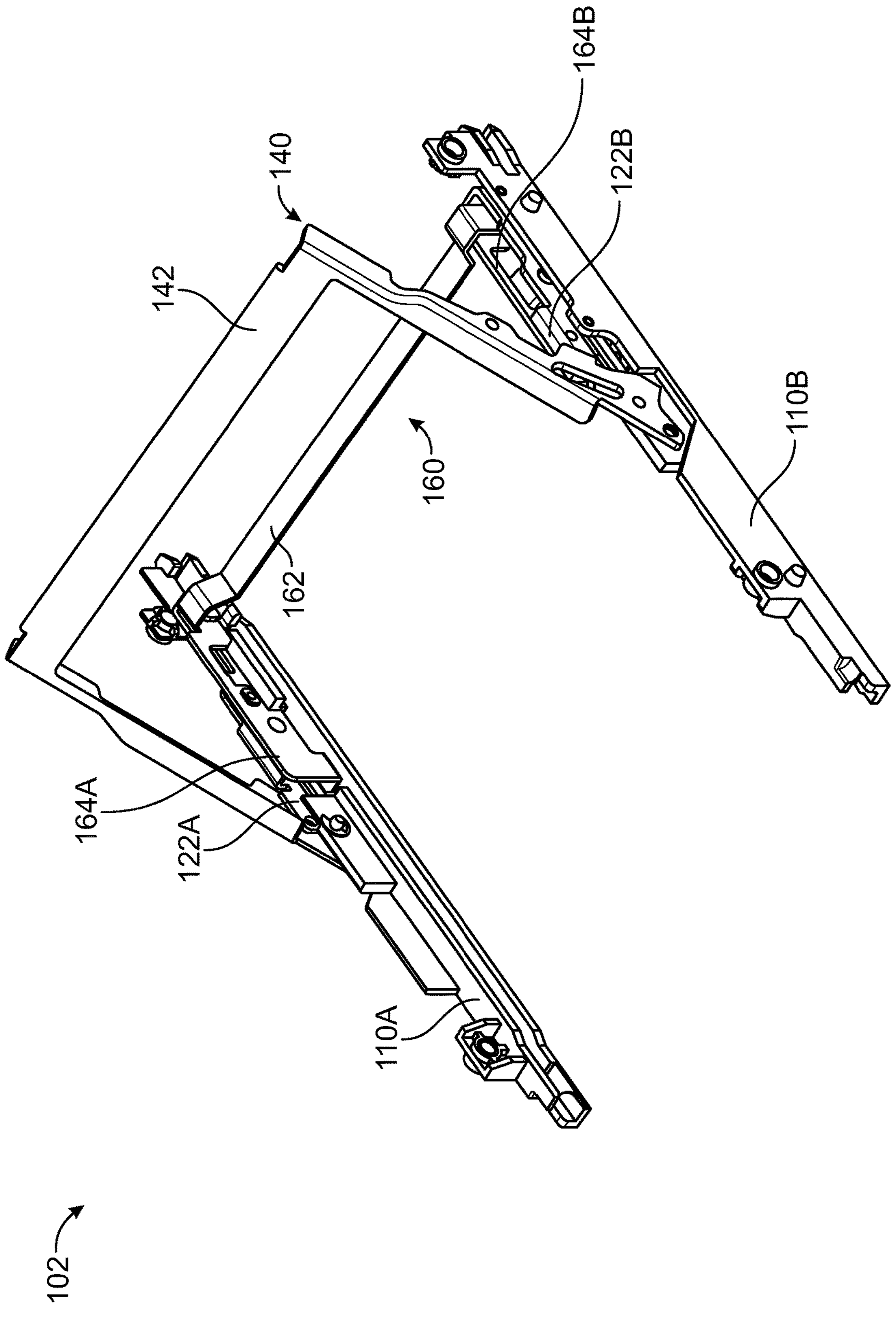
FIG. 8A is a perspective view of the handle assembly when the first handle is in the ejection orientation and the second handle is in an unlocked orientation, according to aspects of the present disclosure.

FIG. 8A shows a perspective view of the handle assembly 100 when the first handle 140 has been rotated to the ejection orientation, and the second handle 160 has been rotated to the unlocked orientation. When the second handle 160 rotates to the unlocked orientation, the body 162 of the second handle 160 moves toward the rails 110A and 110B, and away from the body 142 of the first handle 140. Because the second handle 160 is rotatably coupled to the bracket portions 122A and 122B, the ends of the first and second legs 164A and 164B move in the opposite direction from the body 162, and toward the body 142.

Figure 8B:
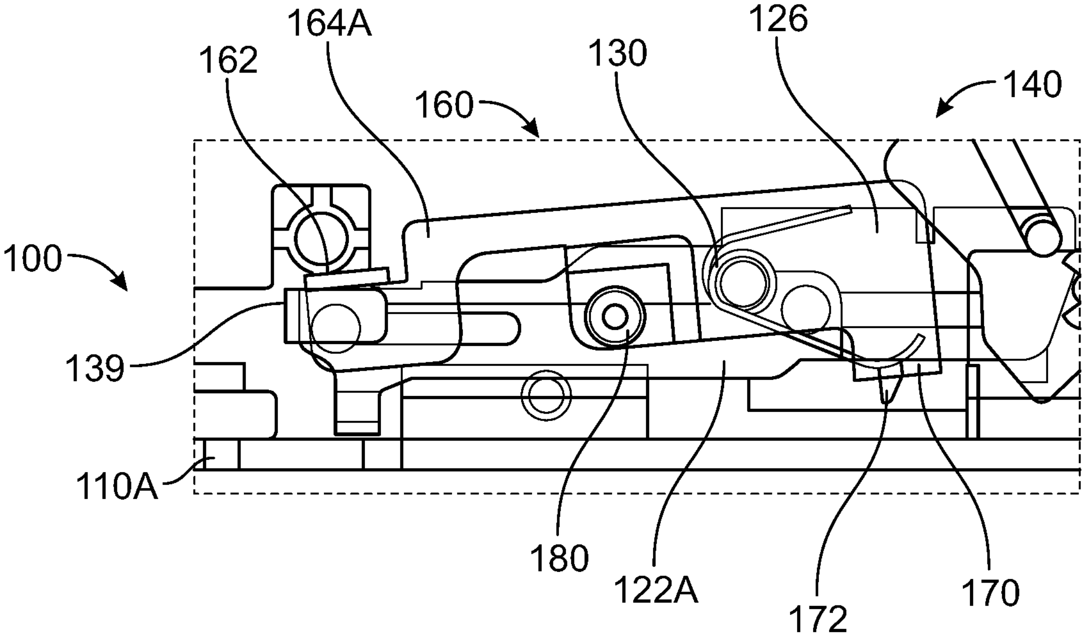
FIG. 8B is a transparent side view of the handle assembly of FIG. 8A, according to aspects of the present disclosure.

FIG. 8B is a transparent side view of the handle assembly 100 when the first handle 140 has been rotated to the ejection orientation, and the second handle 160 has been rotated to the unlocked orientation. As the second handle 160 rotates to the unlocked orientation, the first leg 164A rotates about the pin 180 that couples the first leg 164A and the first bracket portion 122A. The rotation of the second handle 160 to the locked orientation causes the projection 172 of the first leg 164A to move away from the rail 110A toward the unlocked position (e.g., upward relative to the plane of FIG. 8B).

The second handle 160 can be rotated to the unlocked orientation in multiple ways. For example, a user can press down on a portion of the second handle 160 (such as the body 162) so that the second handle 160 rotates to the locked orientation. When this occurs, the projection 172 (forming the locking structure of the second handle 160) will move to the unlocked position. However, the projection 172 is designed so that insertion of the expansion card will also cause the second handle 160 to rotate to the unlocked orientation without further intervention by the user. As shown in FIG. 8B, the projection 172 has a curved surface that faces the direction from which the expansion card is inserted. As the expansion card is inserted and contacts this curved surface, the projection 172 is forced upward to the unlocked position, causing the entire second handle 160 to rotate to the unlocked orientation.

The rotation of the first leg 164A also compresses the torsion spring 130. As the first leg 164A rotates to the unlocked orientation, the ledge 170 moves toward the ledge 126 of the first bracket portion 122A, such that the torsion spring 130 is compressed. The compression of the torsion spring 130 biases the first leg 164A (and the second handle 160 as a whole) toward the locked orientation. The stopping tab 139 is disposed at the end of the first bracket portion 122A adjacent to the body 162 of the second handle 160. As the body 162 rotates toward the rails 110A and 110B, the body 162 contacts the stopping tab 139. This contact prevents the second handle 160 from being rotated past the unlocked orientation.

FIGS. 9-12 illustrate the process for inserting an expansion card 210 into a housing 202 of a computing device 200 using the handle assembly 100. FIGS. 9-12 show side sectional views of the handle assembly 100, such that the rail 110B, the second bracket portion 122B, the second leg 144B of the first handle 140, and the second leg 164A of the second handle 160 are not visible. For ease of illustration, the rail 105A and the rail 105B are not shown.

Figure 9:
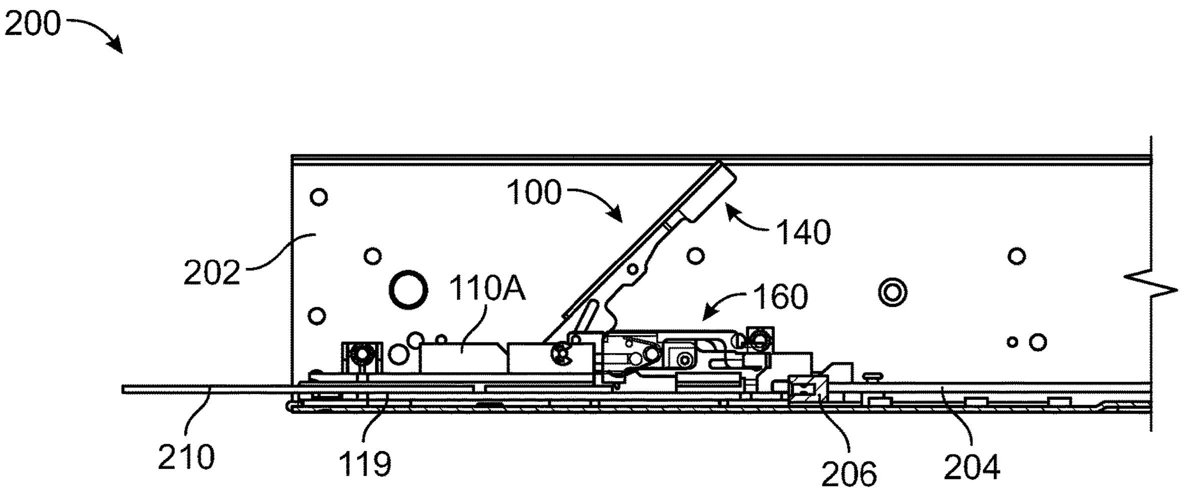
FIG. 9 is a side view of a first step of a method for inserting an expansion card into a computing device using the handle assembly, according to aspects of the present disclosure.

In FIG. 9, the handle assembly 100 is located within the housing 202 of the computing device 200. The first handle 140 of the handle assembly 100 is in the insertion orientation, and the second handle 160 of the handle assembly 100 is in the locked orientation. The expansion card has been initially inserted into the housing 202. The computing device includes a motherboard 204 disposed within the housing 202. The motherboard 204 includes a connector 206 that the expansion card 210 can be connected to. As the expansion card 210 is inserted into the housing 202 towards the connector 206, the expansion card 210 slides along the ledges 119 of the rail 110A (and 110B, not shown). As shown in FIG. 9, the expansion card 210 can be inserted into the housing 202 until the expansion card 210 reaches the projections 172 of the second handle 160 (e.g., the projection 172 of the first leg 164A and the projection 172 of the second leg 164B). Because the second handle 160 is biased toward the locked orientation and no force is being applied to the second handle 160 to move it to the unlocked orientation, the second handle 160 is in the locked orientation and the projections 172 are in the locked position.

The expansion card 210 will generally be disposed in the center of the handle assembly 100 during insertion, such that the expansion card 210 is positioned (i) between the rail 105A and the rail 105B, (ii) between the rail 110A and the rail 110B, (iii) between the first bracket portion 122A and the second bracket portion 122B, (iv) between the first leg 144A and the second leg 144B, and (v) between the leg 164A and the leg 164B.

Figure 10:
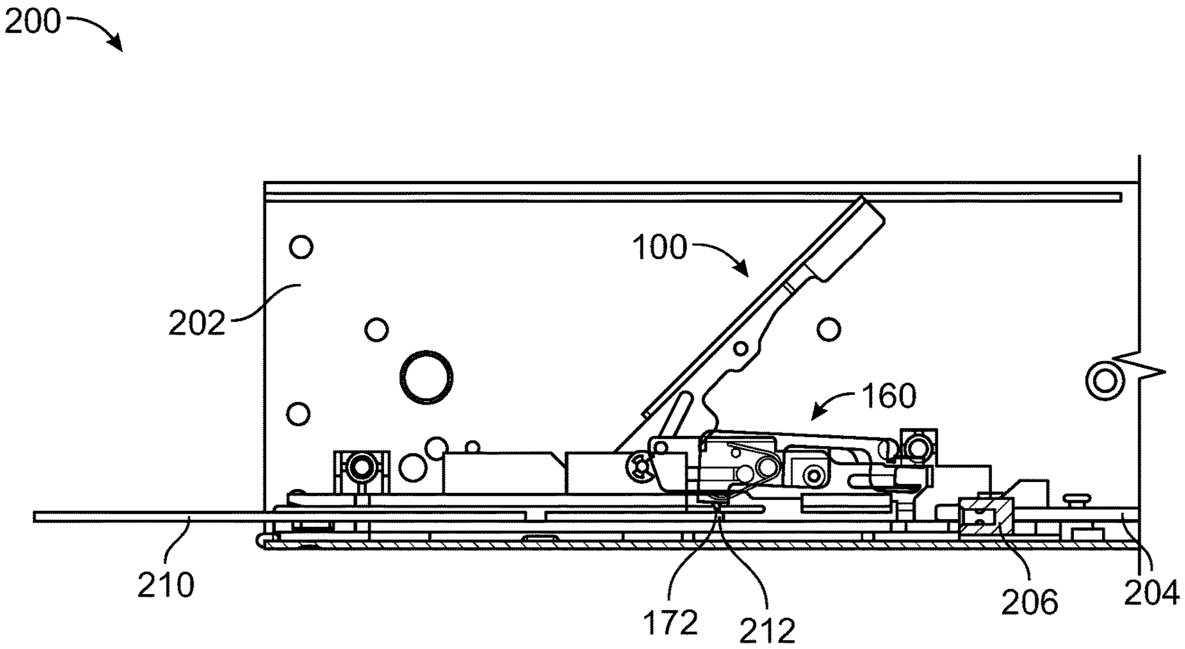
FIG. 10 is a side view of a second step of a method for inserting the expansion card into the computing device using the handle assembly, according to aspects of the present disclosure.

In FIG. 10, the expansion card 210 has been inserted further into the housing 202 toward the connector 206 of the motherboard 204. As the expansion card 210 is inserted further, a leading edge 212 of the expansion card 210 contacts the projections 172 of the second handle 160. Because the projections 172 each have a curved surface that faces the leading edge 212, the contact between the leading edge 212 and the projections 172 causes the second handle 160 to move to the locked orientation. When the second handle 160 moves to the locked orientation, the projections 172 move out of the path of the expansion card 210, allowing the expansion card 210 to be inserted further into the housing 202.

Figure 11:
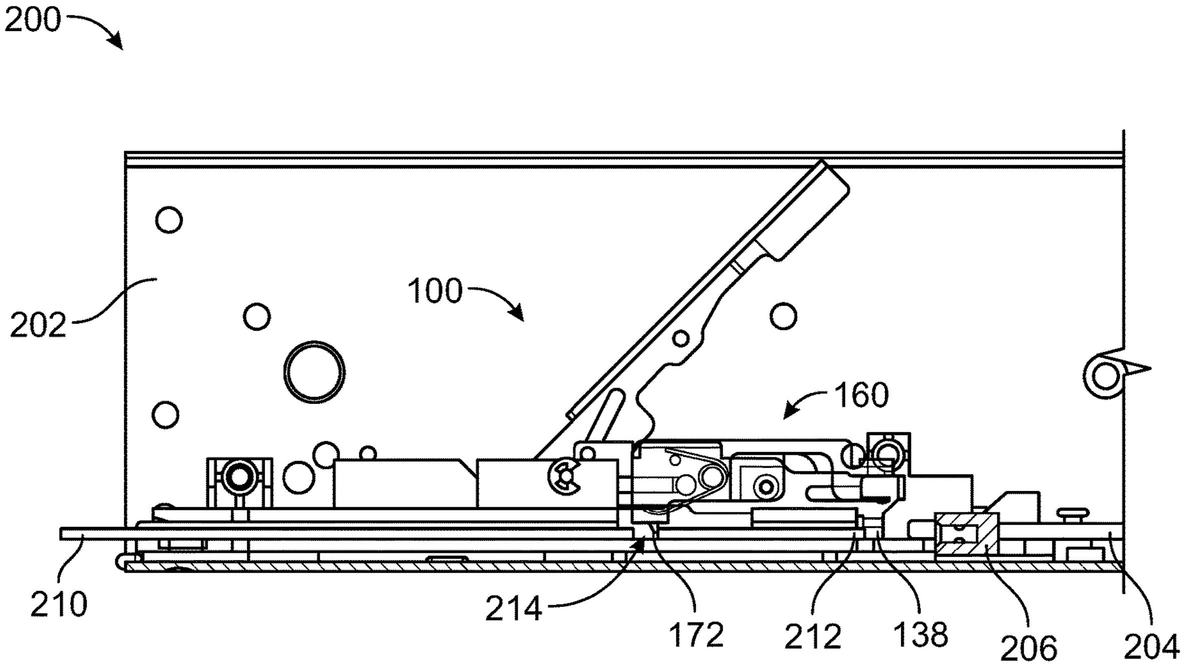
FIG. 11 is a side view of a third step of a method for inserting the expansion card into the computing device using the handle assembly, according to aspects of the present disclosure.

In FIG. 11, the expansion card 210 has been inserted further into the housing 202 toward the connector 206 of the motherboard 204. As the expansion card 210 is inserted further, the leading edge 212 continues to move past the projections 172, which slide along the top surface of the expansion card 210. Eventually, the projections 172 reaches gaps 214 that are defined in the expansion card 210 (e.g., a notch, a cut-out, etc.). While only a single gap 214 is shown in FIG. 11, a typical expansion card 210 will have a gap 214 on either side thereof, each of the two gaps 214 corresponding to one of the projections 172 of the second handle 160.

The gaps 214 are sized so that the projections 172 can be received therein. Because the second handle 160 is biased toward the locked orientation, once the projections 172 reach the gaps 214, the second handle 160 rotates back to the locked orientation. As this occurs, the projections 172 move to the locked position so that the projections 172 extend at least partially through the gaps 214. Because the projections 172 extend through the gaps 214, the expansion card 210 cannot be inserted any further. Generally, the handle assembly 100 and the expansion card 210 are sized so that once the projections 172 reach the gaps 214 and move to the locked orientation, the leading edge 212 will be in contact with (or in close proximity to) the ejection arms 138 of the bracket 120 (e.g., the ejection arm 138 of the first bracket portion 122A and the ejection arm 138 of the second bracket portion 122B).

Figure 12:
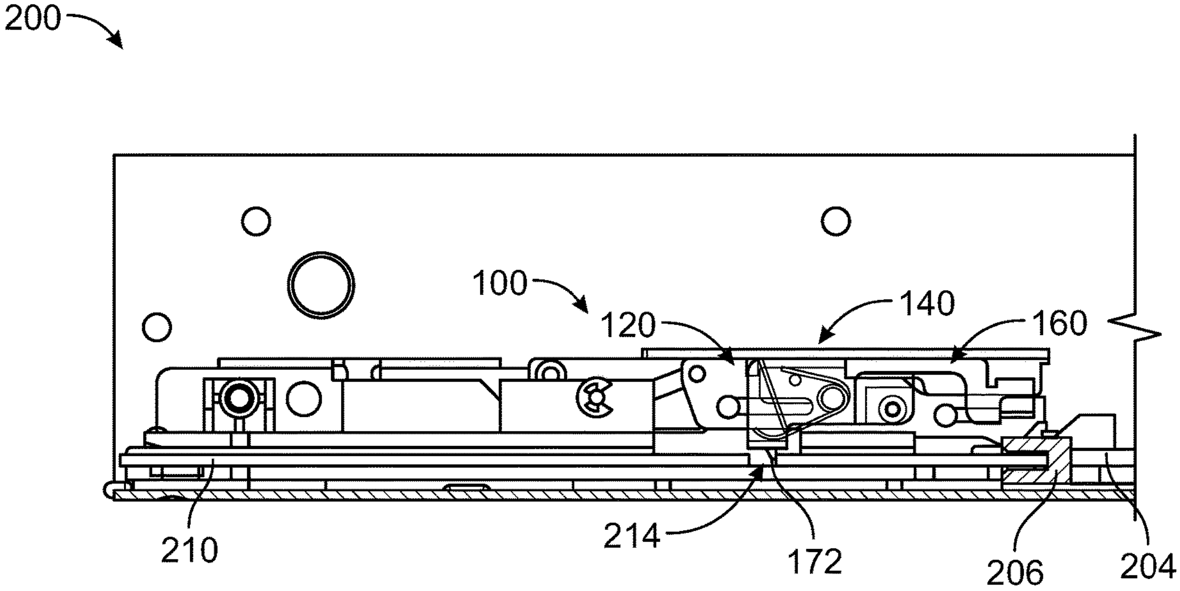
FIG. 12 is a side view of a fourth step of a method for inserting the expansion card into the computing device using the handle assembly, according to aspects of the present disclosure.

In FIG. 12, the first handle 140 of the handle assembly 100 has been moved to the insertion orientation, and the second handle 160 remains in the locked orientation. As the first handle 140 moves to the insertion orientation, the first handle 140 causes the bracket 120 and the second handle 160 to move in a linear direction toward the connector 206 of the motherboard 204. Because the second handle 160 remains in the locked orientation, the projections 172 remain in their locked positions disposed within the gaps 214. Thus, as the second handle 160 moves toward the connector 206, the projections 172 pulls the expansion card 210 toward the connector 206 and causes the expansion card 210 (or a connector of the expansion card 210) to be inserted into the connector, such that the expansion card 210 is electrically connected to the motherboard 204 and the computing device 200.

Figure 13:
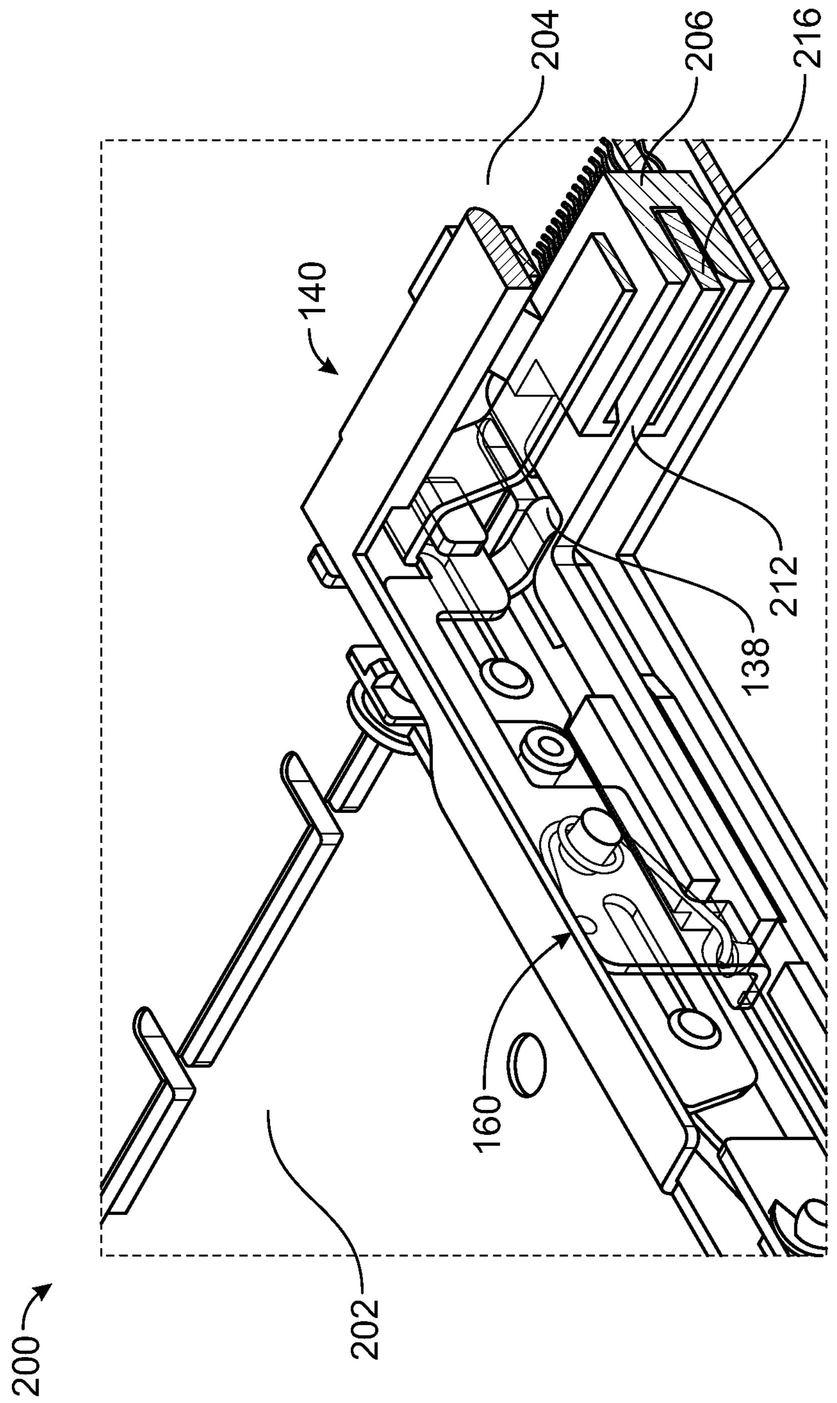
FIG. 13 is a side view of a first step of a method for removing an expansion card from the computing device using the handle assembly, according to aspects of the present disclosure.
Figure 14:
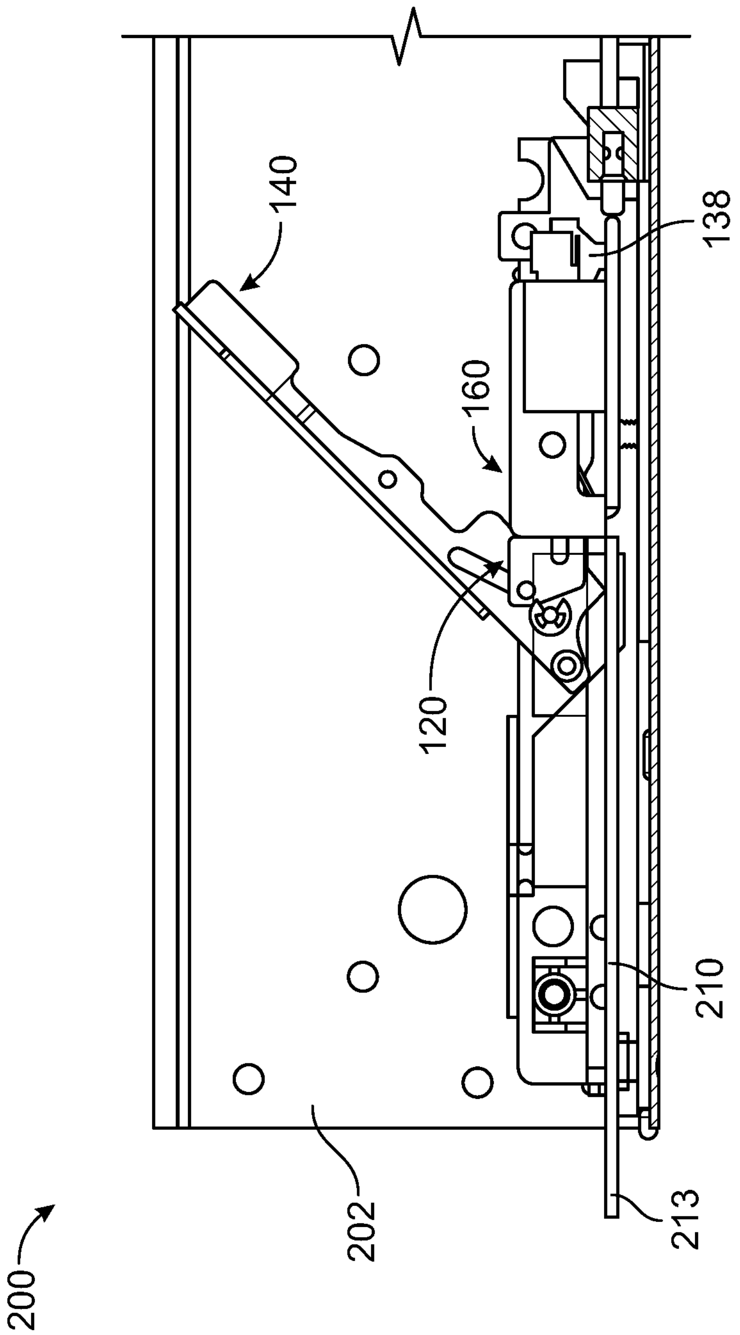
FIG. 14 is a side view of a second step of a method for removing the expansion card from the computing device using the handle assembly, according to aspects of the present disclosure.
Figure 15:
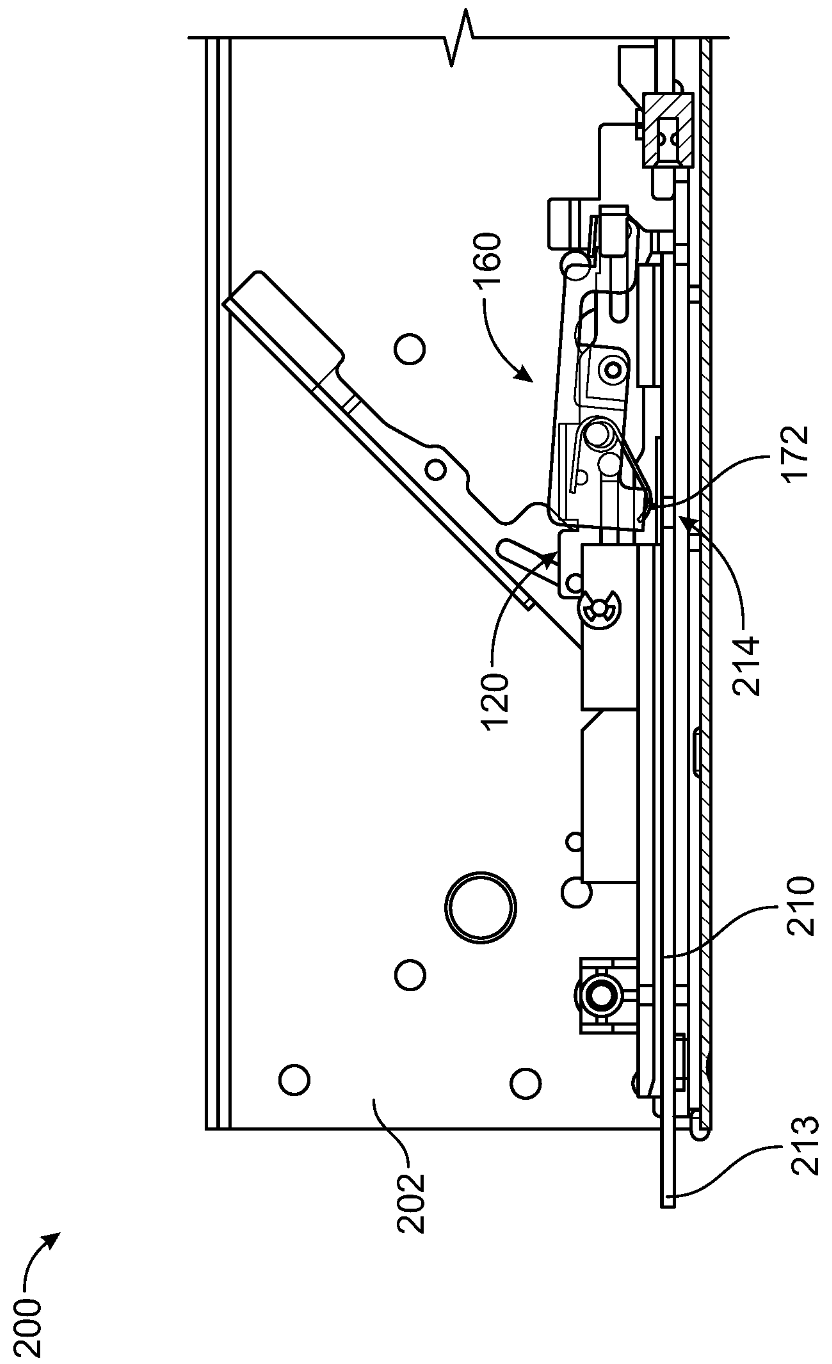
FIG. 15 is a side view of a third step of a method for removing the expansion card from the computing device using the handle assembly, according to aspects of the present disclosure.

FIGS. 13-15 illustrate the process for removing the expansion card 210 from the housing 202 of the computing device 200 using the handle assembly 100. Similar to FIGS. 9-12, the rail 110B, the second bracket portion 122B, the second leg 144B of the first handle 140, and the second leg 164A of the second handle 160 are not in FIGS. 13-15. Further, for ease of illustration, the rail 105A and the rail 105B are not shown.

In FIG. 13, the expansion card 210 (which is shown as being partially cut away) is fully inserted into the housing 202 of the computing device 200, the first handle 140 is in the insertion orientation, and the second handle 160 is in the locked orientation. As shown, the expansion card 210 can include a connector 216 that extends forward of the leading edge 212. When the expansion card 210 is fully inserted into the computing device 200, the connector 216 is inserted into the connector 206 of the motherboard 204. The leading edge 212 of the expansion card 210 contacts the ejection arms 138 of the bracket 120, or is in close proximity with the ejection arms 138.

In FIG. 14, the first handle 140 has moved to the ejection orientation, which causes the bracket 120 and the second handle 160 to move in a linear direction away from the connector 206 of the motherboard 204. As the bracket 120 moves, the ejection arms 138 will push the expansion card 210 away from and out of the connector 206, such that the expansion card 210 is no longer electrically connected to the motherboard 204. Further, a trailing edge 213 of the expansion card 210 will now be extending from the housing 202 to allow the user to easily grasp the expansion card 210.

However, as shown in FIG. 14, the second handle 160 remains in the locked orientation even as it is moved linearly by the rotational movement of the first handle 140. Thus, the projections 172 of the second handle 160 remain in their locked positions disposed in the gaps 214 of the expansion card 210, preventing the user from fully removing the expansion card 210 from the housing 202. In FIG. 15, the second handle 160 has been moved to the unlocked orientation, for example in response to the user applying force to the second handle 160 in a direction toward the bracket 120. The projections 172 move to their unlocked positions, such that the projections 172 are no longer disposed within the gaps 214 of the expansion card 210. The user can thus grasp the trailing edge 213 of the expansion card 210 and remove the expansion card 210 from the housing 202 of the computing device 200.

Figure 16:
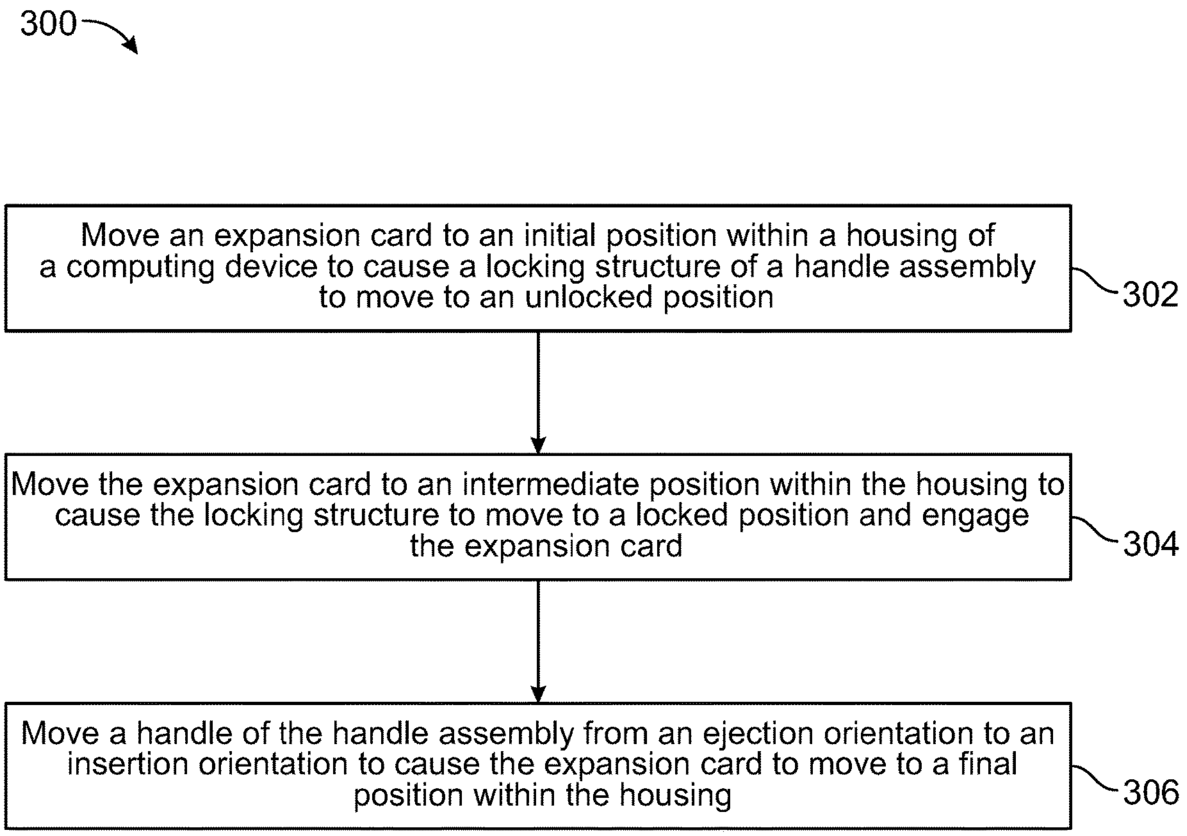
FIG. 16 is a flowchart of a method for inserting an expansion card into a computing device using the handle assembly, according to aspects of the present disclosure.

FIG. 16 shows a flowchart of a method 300 for inserting an expansion card into a computing device using a handle assembly, such as the handle assembly 100. Step 302 of the method 300 includes moving an expansion card (such as the expansion card 210) to an initial position within a housing (such as the housing 202) of a computing device (such as the computing device 200). The movement of the expansion card to the initial position causes a locking structure (such as the projections 172 of the handle assembly 100) to move from a locked position to an unlocked position. When the locking structure is in the unlocked position, the locking structure does not engage the expansion card.

Step 304 of the method 300 includes moving the expansion card to an intermediate position within the housing. The movement of the expansion card to the intermediate position causes the locking structure to move from the unlocked position to the locked position and engage the expansion card. In some implementations, the locking structure includes one or more projections (such as the projections 172 of the handle assembly 100) that are configured to extend at least partially though one or more gaps defined in the expansion card (such as the gaps 214 of the expansion card 210) to thereby engage the expansion card.

Step 306 of the method 300 includes moving a handle of the handle assembly (such as the first handle 140 of the handle assembly 100) from an ejection orientation to an insertion orientation. The movement of the first handle to the insertion orientation causes the expansion card to move to a final position within the housing. When the expansion card is in the final position, at least a portion of the expansion card is received by a connector of the computing device (such as the connector 206 of the motherboard 204).

Generally, the initial position can be any position where the expansion card has contacted the locking structure and moved the locking structure to the unlocked position, including the position of the expansion card 210 in FIG. 10. The intermediate position can be any position where the locking structure has moved back to the locked position and engaged the expansion card in response to the expansion card moving further into the housing of the computing device, before the expansion card has been coupled to the connector of the computing device. Thus, the intermediate position will include the position of the expansion card 210 in FIG. 11, but may also include other positions where the expansion card is closer to the connector. The final position will generally include any position where at least a portion of the expansion card is received by the connector of the computing device, including the position of the expansion card 210 in FIG. 12.

In some implementations, the locking structure has a curved surface (such as the curved surfaces of the projections 172). When the expansion card is moved to the initial position in step 302, a leading edge of the expansion card (such as the leading edge 212 of the expansion card 210) contacts the curved surface of the locking structure to cause the locking structure to move away from the expansion card and to the initial position. In some implementations, the expansion card has one or more gaps defined therein (such as the gaps 214 of the expansion card 210). When the expansion card is moved to the intermediate position in step 304, the one or more gaps become aligned with the locking structure such that the locking structure moves back to the locked position. In the locked position, at least a portion of the locking structure can be disposed within the one or more gaps.

Figure 17:
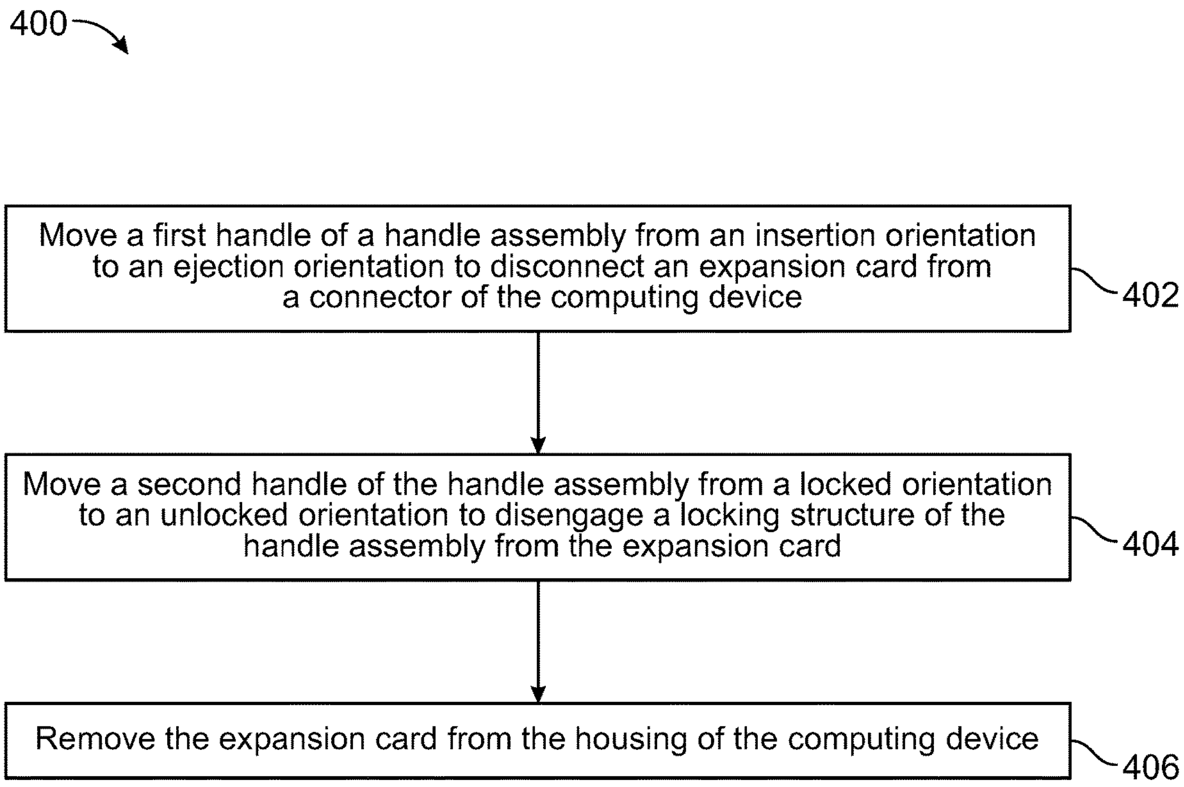
FIG. 17 is a flowchart of a method for removing an expansion card from a computing device using the handle assembly, according to aspects of the present disclosure.

FIG. 17 shows a flowchart of a method 400 for removing an expansion card from a computing device using a handle assembly, such as the handle assembly 100. Step 402 of the method 400 includes moving a first handle of the handle assembly (such as the first handle 140) to from an insertion orientation to an ejection orientation. The movement of the first handle to the ejection orientation causes the expansion card to be disconnected from a connector of the computing device (such as the connector 206 of the computing device 200). In some implementations, the handle assembly includes a bracket (such as the bracket 120 of the handle assembly 100) coupled to the first handle. In response to the first handle moving from the insertion orientation to the ejection orientation, the bracket moves linearly within the housing of the computing device and pushes the expansion card away from the connector, which causes the expansion card to disconnected from the connector. In some implementations, a portion of the expansion card extends out of the housing of the computing device after the first handle has moved to the ejection orientation.

Step 404 of the method 400 includes moving the expansion card to an intermediate position within the housing. The movement of the expansion card to the intermediate position causes the locking structure to move from the unlocked position to the locked position and engage the expansion card. In some implementations, the locking structure includes one or more projections (such as the projections 172 of the handle assembly 100) that are configured to extend at least partially though one or more gaps defined in the expansion card (such as the gaps 214 of the expansion card 210) to thereby engage the expansion card. In some implementations, the locking structure includes one or more projections (such as the projections 172 of the second handle 160) that are configured to extend at least partially though one or more gaps defined in the expansion card (such as the gaps 214 of the expansion card 210) to thereby engage the expansion card and prevent the expansion card from moving. When the locking structure moves to the unlocked position, the projections move away from the expansion card so that they no longer extend through the gaps, and that expansion card can move.

Step 406 of the method 400 includes removing the expansion card from the computing device. In some implementations, the user can grasp the expansion card and manually remove the expansion card from the computing device.

Although the disclosed embodiments have illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described been above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. A handle assembly for interacting with an expansion card configured to be inserted into a computing device, the handle assembly comprising:

a bracket movably coupled to a housing of the computing device, the bracket including an aperture defined therein;

a first handle rotatably coupled to the bracket, the first handle being rotatable between an insertion orientation and an ejection orientation, the first handle including a channel defined therein, the first handle being coupled to the bracket via a pin that extends through the channel and the aperture; and a second handle movably coupled to the bracket and movable between a locked orientation and an unlocked orientation, the second handle including a locking structure configured to lock the expansion card within the housing, wherein the bracket and the second handle are mechanically coupled with the first handle for linear movement within the housing, the linear movement being in response to rotation of the first handle between the insertion orientation and the ejection orientation, the pin being configured to slide within the channel and move the bracket linearly relative to the housing in response to rotation of the first handle, and wherein the second handle and the locking structure are mechanically coupled such that in response to movement of the second handle between the locked orientation and the unlocked orientation the locking structure is configured to move between a locked position and an unlocked position.

2. The handle assembly of claim 1, wherein in response to the expansion card being at least partially inserted into the housing of the computing device, rotation of the first handle between the insertion orientation and the ejection orientation causes the expansion card to move linearly within the housing.

3. The handle assembly of claim 2, wherein in response to the expansion card being at least partially inserted into the housing of the computing device and the locking structure engages the expansion card, rotation of the first handle from the ejection orientation to the insertion orientation causes the locking structure to move linearly and push the expansion card in a first linear direction within the housing.

4. The handle assembly of claim 3, wherein in response to the expansion card being fully inserted into the computing device, rotation of the first handle from the insertion orientation to the ejection orientation causes the bracket to move linearly and push the expansion card in a second linear direction within the housing that is opposite the first linear direction.

5. The handle assembly of claim 1, wherein the second handle is rotatably coupled to the bracket and rotates between the locked orientation and the unlocked orientation.

6. The handle assembly of claim 5, wherein in response to the expansion card being at least partially inserted into the computing device, rotation of the second handle between the locked orientation and the unlocked orientation causes the locking structure to engage or disengage the expansion card.

7. The handle assembly of claim 6, wherein in response to the expansion card being at least partially inserted into the computing device, rotation of the second handle from the locked orientation to the unlocked orientation causes the locking structure to move to the unlocked position and away from the expansion card such that the locking structure disengages the expansion card.

8. The handle assembly of claim 6, wherein in response to the expansion card being at least partially inserted into the computing device, rotation of the second handle from the unlocked orientation to the locked orientation causes the locking structure to move to the locked position and toward the expansion card such that the locking structure engages the expansion card.

9. The handle assembly of claim 5, wherein the locking structure includes a projection extending from the second handle, the projection extending through a gap in the expansion card when the expansion card is at least partially inserted into the computing device and the locking structure is in the locked position.

10. The handle assembly of claim 9, wherein the projection has a curved surface that is configured to contact a front edge of the expansion card in response to the expansion card being inserted into the computing device when the locking structure is in the locked position.

11. The handle assembly of claim 10, wherein the contact between the curved surface of the projection and the front edge of the expansion card causes the locking structure to move from the locked position to the unlocked position.

12. The handle assembly of claim 11, wherein the second handle is biased toward the locked orientation such that in response to a gap in the expansion card aligning with the projection as the expansion card is further inserted into the housing, the locking structure moves from the unlocked position to the locked position such that the projection extends through the gap in the expansion card.

* * * * *